(12) United States Patent
Hatakeyama

(10) Patent No.: US 7,316,484 B2
(45) Date of Patent: Jan. 8, 2008

(54) ILLUMINATOR AND PROJECTION IMAGE DISPLAY EMPLOYING IT

(75) Inventor: Atsushi Hatakeyama, Ibaraki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 230 days.

(21) Appl. No.: 10/514,006

(22) PCT Filed: Oct. 8, 2003

(86) PCT No.: PCT/JP03/12865

§ 371 (c)(1),
(2), (4) Date: Nov. 8, 2004

(87) PCT Pub. No.: WO2004/034143

PCT Pub. Date: Apr. 22, 2004

(65) Prior Publication Data

US 2005/0146891 A1    Jul. 7, 2005

(30) Foreign Application Priority Data

Oct. 9, 2002   (JP) ............................ 2002-295547
May 20, 2003  (JP) ............................ 2003-142489
Sep. 18, 2003  (JP) ............................ 2003-325810

(51) Int. Cl.
*G03B 21/20* (2006.01)
*G03B 21/26* (2006.01)

(52) U.S. Cl. ..................... 353/102; 353/94

(58) Field of Classification Search ............... 353/94, 353/98, 102; 359/856, 857; 362/26, 27, 362/341, 346, 356, 551, 560, 5
See application file for complete search history.

(56) References Cited

U.S. PATENT DOCUMENTS 5,526,237 A * 6/1996 Davenport et al. ......... 362/551
5,765,934 A * 6/1998 Okamori et al. ............ 353/94
5,799,126 A   8/1998 Nagatani et al.
5,902,033 A * 5/1999 Levis et al. ................ 353/122
6,139,156 A * 10/2000 Okamori et al. ............ 353/98
6,254,246 B1* 7/2001 Tiao et al. ................. 362/614
6,371,617 B1   4/2002 Nishida et al.
6,375,330 B1* 4/2002 Mihalakis ................... 353/31
6,443,584 B2* 9/2002 Suzuki et al. .............. 362/633
6,464,375 B1* 10/2002 Wada et al. ................ 362/268

(Continued)

FOREIGN PATENT DOCUMENTS

| EP | 1 122 580 | 8/2001 |
|----|-----------|--------|
| JP | 5-72628   | 3/1993 |
| JP | 9-43562   | 2/1997 |
| JP | 9-50082   | 2/1997 |

(Continued)

*Primary Examiner*—Rodney Fuller
(74) *Attorney, Agent, or Firm*—Hamre, Schumann, Mueller & Larson, P.C.

(57) ABSTRACT

An illuminator comprising two light source sections (101, 102), a rod integrator (1), and a relay lens system (4) for introducing a light flux emitted from the rod integrator (1), wherein the rod integrator (1) is a columnar optical element having an incident end face (130F) and an exit end face (130B). One pair of opposite side faces out of four side faces are formed so that the planes face each other in parallel while the other pair of opposite side faces form a taper face where the planes face each other while inclining at a specified angle such that the opposite side faces recede from the incident end face (130F) toward the exit end face (130B). Lights from the two light source sections (101, 102) are converged to the vicinity of the incident end face (130F) of the rod integrator (1).

15 Claims, 19 Drawing Sheets

U.S. PATENT DOCUMENTS

| | | | |
|---|---|---|---|
| 6,505,939 B1 * | 1/2003 | Bierhuizen et al. | 353/94 |
| 6,547,401 B2 * | 4/2003 | Nishida et al. | 353/98 |
| 6,729,730 B2 | 5/2004 | Ito | |
| 6,834,071 B2 * | 12/2004 | Sugiyama | 372/108 |
| 6,895,164 B2 * | 5/2005 | Saccomanno | 385/146 |
| 2002/0018184 A1 | 2/2002 | Ito | |
| 2002/0027642 A1 | 3/2002 | Nishida et al. | |
| 2004/0174500 A1 | 9/2004 | Ito | |
| 2004/0201898 A1 * | 10/2004 | Chang et al. | 359/640 |

FOREIGN PATENT DOCUMENTS

| | | |
|---|---|---|
| JP | 10-48746 | 2/1998 |
| JP | 11-142780 | 5/1999 |
| JP | 2000-75407 | 3/2000 |
| JP | 2000-206455 | 7/2000 |
| JP | 2000-231344 | 8/2000 |
| JP | 2000-250136 | 9/2000 |
| JP | 2001-215613 | 8/2001 |
| JP | 2001-305656 | 11/2001 |
| JP | 2001-356404 | 12/2001 |
| JP | 2002-62588 | 2/2002 |
| WO | 00/67057 | 11/2000 |

\* cited by examiner

US 7,316,484 B2

ILLUMINATOR AND PROJECTION IMAGE DISPLAY EMPLOYING IT

CROSS REFERENCE TO RELATED APPLICATIONS

This application is a national stage application of the Patent Cooperation Treaty application PCT/JP2003/012865, filed on Oct. 8, 2003, and entitled ILLUMINATOR AND PROJECTION IMAGE DISPLAY EMPLOYING IT, which claims priority to Japanese Application Nos. 2002-295547, filed on Oct. 9, 2002, 2003-142489, filed on May 20, 2003, and 2003-325810, filed on Sep. 18, 2003.

TECHNICAL FIELD

The present invention relates to illuminators and projection image display devices using the same.

BACKGROUND ART

Conventionally, projection image display devices, by which a small light valve displaying an image in response to a video signal is illuminated and the image is magnified and projected using a projection lens, are known as a method for displaying large-screen videos. Some light valves use a transmissive type or a reflective type liquid crystal panel and some light valves use a digital mirror device, which is an aggregation of micro-mirrors, and projection image display devices using these have been put into practical use. The following is a description of a conventional projection image display device.

FIG. 21 is a conceptual diagram of an optical system showing a projection image display device that uses a conventional columnar optical element (hereafter, "rod integrator"), and a light valve. In this drawing, reference numeral 2 is a lamp, reference numeral 3 is an elliptical concave mirror, reference numeral 4 is a relay lens system, reference numeral 5 is a field lens, reference numeral 6 is a transmissive light valve, reference numeral 7 is a projection lens, and reference numeral 15 is a rod integrator made of a glass material.

The following is a description of the operation. The light-emitting center of the lamp 2 is arranged in the vicinity of a first focal point of the elliptical concave mirror 3. After the light flux emitted from the lamp 2 is reflected by the elliptical concave mirror 3, the light is converged in the vicinity of a second focal point of the elliptical concave mirror 3. The incident face of the rod integrator 15 is arranged in the vicinity of the second focal point. The light flux of the incident light is totally reflected as appropriate by side surfaces in the longitudinal direction of the rod integrator 15 and emitted by the rod integrator 15.

The following is a description of the fundamental operation of the conventional rod integrator 15. FIG. 22 is a top view of the operation of an incident light ray and FIG. 23 is a lateral view of the operation of an incident light ray. In these drawings, the light ray, which is incident at an angle θ, is totally reflected as appropriate by side surfaces in the longitudinal direction of the rod integrator 15. The light ray is transmitted while maintaining its angle, and the light is emitted at an angle θ. Accordingly, if the maximum value of the converging angle of the elliptical concave mirror 3 is 30° for example, a light ray of a maximum 30° corresponding to this is emitted from the rod integrator 15.

Furthermore, if the angles of the incident light rays are different, the number of times the light is totally reflected as appropriate by the side surfaces in the longitudinal direction of the rod integrator 15 is different. Since these are merged at the exit face, the light rays are superimposed at the exit face even when there is an uneven illumination distribution at the incident face. A result of this is that it is possible to obtain an illumination light flux at the exit face of the rod integrator 15 that has superior uniformity and that has a form that is approximately equivalent to a desired illumination range. Note, however, that since better uniformity can be achieved with a larger the number of reflections, a sufficient length of the rod integrator 15 obviously has to be ensured.

Furthermore, the light flux emitted from the rod integrator 15 illuminates the transmissive light valve 6 via a relay lens system 4, which is configured by at least one lens, and a field lens 5. The transmissive light valve 6 displays an image based on an electric signal that is output from a drive circuit (not shown). The image displayed on the transmissive light valve 6 is magnified by a projection lens 7 and projected onto a screen (not shown).

Furthermore, there is a strong demand to make the projected images of such projection image display devices brighter, and projection image display devices have been disclosed that use a plurality of light sources. For example, methods are disclosed such as in Patent Document 1, in which emitted light fluxes from a plurality of light sources are synthesized using a light guiding means such as an optical fiber, and a method in which light sources are arranged in predetermined positions and reflected light is synthesized by a reflective mirror and a reflective prism or the like.

Further still, in Patent Document 2 below, there is one light source, but a tapered portion is formed in the rod integrator that continuously increases in cross section from the incident end face to the exit end face. By controlling the tapering angle of the tapered portion, this structure achieves a desired value in the parallelism of the converged light flux from the lamp.

To increase the brightness in the configuration of the conventional projection image display devices shown above, methods are employed such as raising the lamp power consumption, and using a lamp that is almost a point light source, for example an extra-high pressure mercury lamp with an electrode distance of 1.3 mm or less, and increasing the rate of light convergence to increase the brightness.

However, when using the above two methods, increasing the power consumption while keeping the same electrode distance considerably shortens the life of the light source. Furthermore, leaving the power consumption the same and further shortening the distance between electrodes also results in considerable shortening of the life of the light source. Accordingly, how to further increase device brightness without shortening the life of the light source is an issue in configurations with a single light source such as in Patent Document 2.

On the other hand, a method disclosed in Patent Document 1, which attempts to increase brightness by using a plurality of light sources, is a synthesizing method in which the converging angles of light rays emitted from light source portions, which are made of a light source and an elliptical concave mirror, are left unchanged for emission. For example, when the light fluxes from two light source portions are synthesized, light rays emitted from the elliptical concave mirror with a converging angle of about 15° will have a maximum divergence angle of about 30° that is synthesized and emitted.

For this reason, although it seems to possible to realize a condenser lens to be used at a stage following the synthesizing portion made of a reflective mirror or reflective prism, when trying to achieve a sufficient condensing ratio with the elliptical concave mirror for the converging angle of about 15°, it is necessary that the positions of the first and second focal points of the elliptical concave mirror are sufficiently distanced, and that the elliptical concave mirrors themselves are large, and therefore there is the problem that the device cannot be miniaturized.

Furthermore, presently it is common to use elliptical concave mirrors with a converging angle of approximately 30°, which gives importance to improving brightness and device miniaturization, but when using two of these, the maximum divergence angle corresponding to the converging angle of the light rays reflected from synthesizing portions made of a reflective mirror or reflective prism is about 60°, and it is difficult and impractical to achieve a condenser lens to be used at a stage following the synthesizing portion.

With a configuration of Patent Document 2, the divergence angles at the exit end face can be controlled using a rod integrator with a tapered portion. However, in single light source configurations, this technique is for controlling the parallelism of light fluxes in both horizontal and vertical directions using tapered surfaces formed in the rod integrator in both the horizontal and vertical directions. That is, Patent Document 2 does not disclose a technique addressing the enlargement of the maximum divergence angle when using two light sources.

Patent Document 1
JP H9-50082A
Patent Document 2
JP H11-142780A

DISCLOSURE OF INVENTION

The present invention solves the above-described conventional problems and it is an object thereof to provide an illuminator and a projection image display device using this illuminator that can achieve high brightness and uniformity from a plurality of light source portions onto an area to be illuminated.

In order to achieve this object, an illuminator according to the present invention is provided with a light source portion including a lamp and a concave mirror; a rod integrator; and a relay lens system that guides a light flux emitted from the rod integrator; wherein the rod integrator is a columnar optical element having an incident end face at a front side and an exit end face at a back side; wherein, when a long-side direction of the exit end face is a horizontal direction and a short-side direction is a vertical direction, of four side surfaces other than the front side and the back side of the columnar optical element, one pair of opposing side surfaces is formed as tapered surfaces in which the side surfaces face each other at an inclination of a predetermined angle such that a distance between the side surfaces in the horizontal direction or the vertical direction increases from the incident end face toward the exit end face; wherein light from the light source portion is converged and irradiated onto a vicinity of the incident end face of the rod integrator; and wherein two of said light source portions are arranged in the horizontal direction or the vertical direction.

Next, a projection image display device according to the present invention is provided with a light source portion including a lamp and a concave mirror; a rod integrator; a relay lens system that guides a light flux emitted from the rod integrator; a light valve that modulates a light flux guided from the relay lens system and forms an image; and a projection lens that projects an image formed by the light valve; wherein the rod integrator is a columnar optical element having an incident end face at a front side and an exit end face at a back side; wherein, when a long-side direction of the exit end face is a horizontal direction and a short-side direction is a vertical direction, of four side surfaces other than the front side and the back side of the columnar optical element, one pair of opposing side surfaces is formed as tapered surfaces in which the side surfaces face each other at an inclination of a predetermined angle such that a distance between the side surfaces in the horizontal direction or the vertical direction increases from the incident end face toward the exit end face; wherein light from the light source portion is converged and irradiated onto a vicinity of the incident end face of the rod integrator; and wherein two of said light source portions are arranged in the horizontal direction or the vertical direction.

BEST MODE FOR CARRYING OUT THE INVENTION

Figure 1:
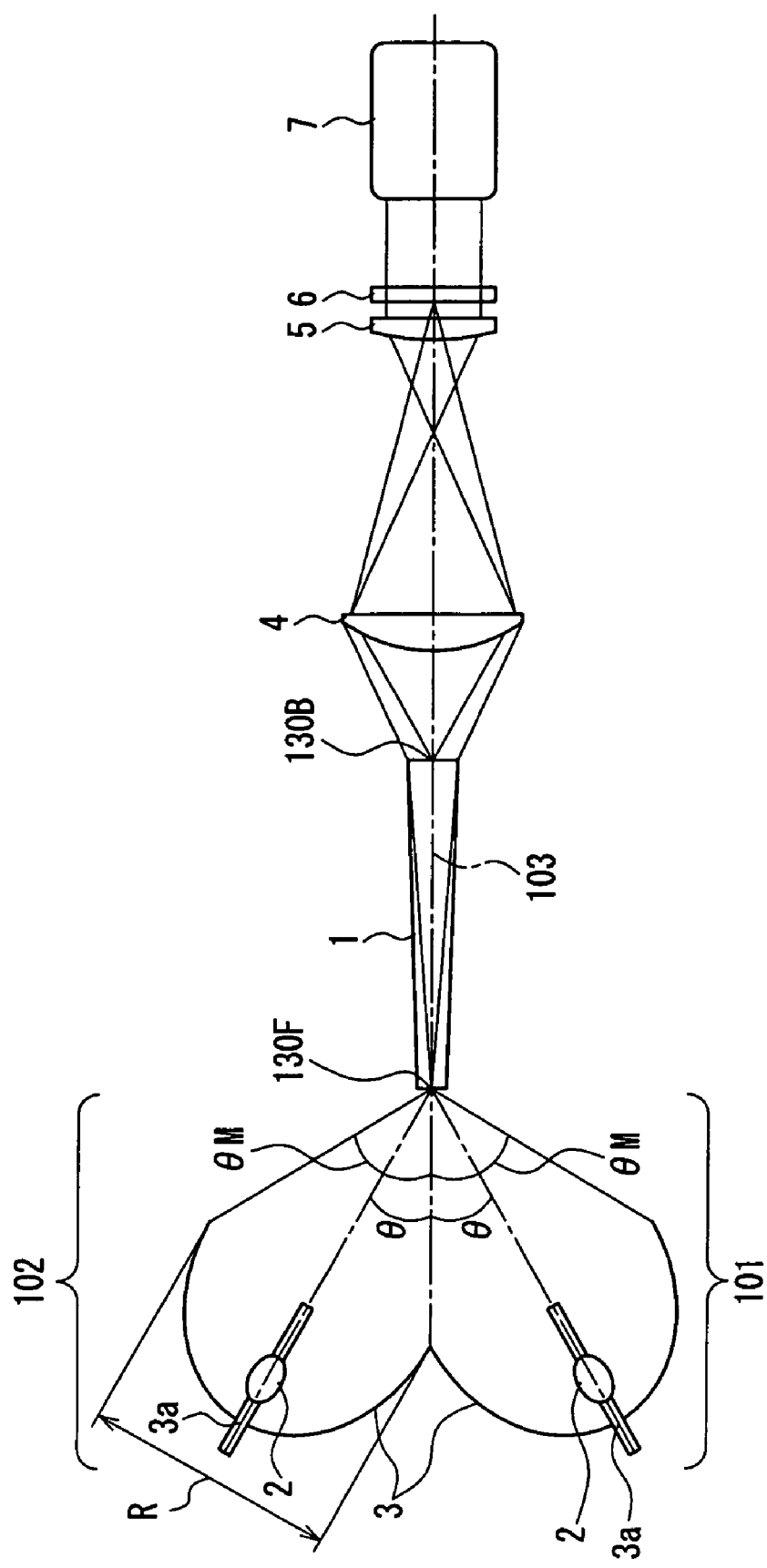
FIG. 1 is a top view of a conceptual diagram of an optical system according to Embodiment 1 of the present invention.

With an illuminator or a projection image display device according to the present invention, it is possible to control the divergence angle of light at the exit end face using a pair of tapered surfaces of the rod integrator, and when using two or more light source portions, it is possible to make the divergence angles of light at the exit end face substantially equivalent in the horizontal and vertical directions even when the divergence angles at the incident end face are different in the horizontal and vertical directions. For this reason, it is possible to achieve a light of high brightness and uniformity. Furthermore, it is possible to achieve device miniaturization.

In the illuminator and the projection image display device according to the present invention, it is preferable that, of the four side surfaces other than the front side and the back side of the columnar optical element, one pair of opposing side surfaces is provided with a portion in which the side surfaces are parallel to each other, and the other pair of opposing side surfaces is formed as tapered surfaces in which the side surfaces face each other at an inclination of a predetermined angle such that the distance between the two side surfaces increases from the incident end face toward the exit end face. With this configuration, light reflected by the side surfaces of the pair of parallel planes is such that the divergence angle of light at the incident end face and the divergence angle of light at the exit end face are the same, and light reflected by the tapered surfaces is such that the divergence angle of light at the incident end face and the divergence angle of light at the exit end face are different. When using a total of two light source portions, this makes it possible to achieve a divergence angle of light at the exit end face that is substantially equivalent in the horizontal direction and the vertical direction even when the divergence angles of light at the incident end face are different in the horizontal direction and the vertical direction.

Furthermore, it is preferable that, parallel to the two light source portions, a further two light source portions are arranged, and of four side surfaces other than the front side and the back side of the columnar optical element, both pairs of opposing side faces are formed as tapered surfaces in which the side surfaces face each other at an inclination of a predetermined angle such that the distance between the two side surfaces increases from the incident end face toward the exit end face. When using a total of four light source portions, with this configuration it is possible to make the divergence angle of light at the exit end face substantially equivalent in the horizontal and vertical directions, and it is possible to make the divergence angle of light at the exit end face small than the divergence angle of light at the incident end face. This is particularly advantageous when a light of high brightness is desirable.

Furthermore, it is preferable that, when the two light source portions are a first light source portion and a second light source portion, the illuminator further comprises a first reflector for guiding light from the first light source portion to the incident end face of the rod integrator and a second reflector for guiding light from the second light source portion to the incident end face of the rod integrator. With this configuration, since the first and second reflector are provided, it is possible to achieve a high level of freedom in the arrangement of the two light source portions.

Furthermore, it is preferable that a maximum value in the horizontal direction and a maximum value in the vertical direction of the divergence angle of light emitted from the exit end face of the rod integrator are substantially the same. With this embodiment, there is the advantage of achieving a light of high brightness and uniformity.

Furthermore, it is preferable that, when a normal direction on the pair of parallel planes is a first direction and a direction that is perpendicular to a center line of the rod integrator and perpendicular to the first direction is the second direction, the two light source portions are arranged such that a divergence angle of light entering the incident end face of the rod integrator has a maximum value in the second direction that is larger than a maximum value in the first direction; that light corresponding to the maximum value in the second direction is reflected by the tapered surfaces of the rod integrator and light corresponding to the maximum value in the first direction is reflected by the parallel planes of the rod integrator; and that a divergence angle of light at the exit end face has a maximum value in the first direction that is substantially the same as a maximum value in the first direction at the incident end face, and the maximum value of the divergence angle of the exit end face in the second direction is smaller than the maximum value in the second direction at the incident end face. With this configuration, it is possible to achieve control such that while using the parallel surfaces of the rod integrator to keep the divergence angle of light in the vertical direction at the incident end face substantially equivalent, the tapered surfaces of the rod integrator can be used to make the divergence angle of light in the horizontal direction at the exit end face different from the divergence angle of light in the horizontal direction at the incident end face.

Furthermore, it is preferable that the first light source portion and the second light source portion are arranged such that the second light source portion is in an emission direction of the first light source portion.

Furthermore, it is preferable that the illuminator further comprises a projection lens, and that optical axes of the concave mirrors of the two light source portions and an optical axis of the projection lens are perpendicular. With this configuration, the light source portions can be made not to slant even when the installation adjustment angle is changed, thus reducing the possibility of harming the life of the light sources, and achieving increased reliability.

Furthermore, it is preferable that the first light source portion and the second light source portion are arranged such that an optical axis of a concave mirror of the first light source portion and an optical axis of a concave mirror of the second light source portion do not intersect a center line of the rod integrator. With this configuration, by providing reflector, it is possible to prevent the occurrence of areas that cannot be used by the light rays.

Furthermore, it is preferable that the first and second reflector are constituted by a reflection mirror or prism coated with a dielectric material.

Furthermore, it is preferable that, when an angle between a center line of the rod integrator and an optical axis of the concave mirror that passes through an apex of the concave mirror is an incident angle; an angle formed by a light flux emitted from a most peripheral area of an effective aperture of the concave mirror and a center line of the rod integrator at the incident end face is a maximum angle; and a difference between the maximum angle and the incident angle is a converging angle; then the incident angle is smaller than the converging angle. With this configuration, it is possible to improve the device brightness.

Furthermore, it is preferable that a ratio of the incident angle to the converging angle is in a range of at least 60% and at most 80%. With this configuration, it is possible to achieve excellent convergence efficiency.

Furthermore, it is preferable that the projection image display device according to the present invention is provided with a means for turning light that turns a light flux emitted from the rod integrator around a center line of the rod integrator and guides the light flux to the light valve in accordance with an arrangement of the light valve. With this configuration, since a means for turning light is provided, it is possible to improve the efficiency of light utilization of the light valve.

Embodiment 1

First, the structure and operation of a projection image display device according to Embodiment 1 is described using FIG. 1. FIG. 1 is a top view of a conceptual diagram of an optical system according to Embodiment 1.

As shown in FIG. 1, the projection image display device according to the present embodiment is provided with two light source portions 101 and 102, a rod integrator 1, a relay lens system 4 that guides the light flux emitted from the rod integrator 1, a field lens 5, a transmissive light valve 6 that modulates the light flux guided by the relay lens system 4 and forms an image, and a projection lens 7 that projects the image formed by the light valve 6.

It should be noted that in FIG. 1, although an example is shown of a projection image display device, the structure from the two light source portions 101 and 102 to the relay lens system 4 in the order in which the light flux proceeds also may be an illuminator, which can be used independently. Furthermore, a projection lens further may be added to the illuminator. This is also true for the embodiments described below.

The light source portions 101 and 102 have the same structure and are respectively provided with a light source 2, and a concave mirror 3 which is a condenser optical system that condenses light from the light sources 2. An extra-high pressure mercury lamp, a metal halide lamp, a xenon lamp, or a white lamp such as a halogen lamp can be used as the light sources 2. In the example of this diagram, the concave mirrors 3 are elliptical concave mirrors. Furthermore, the rod integrator 1 is formed with a glass material that has good heat resistance.

Figure 2:
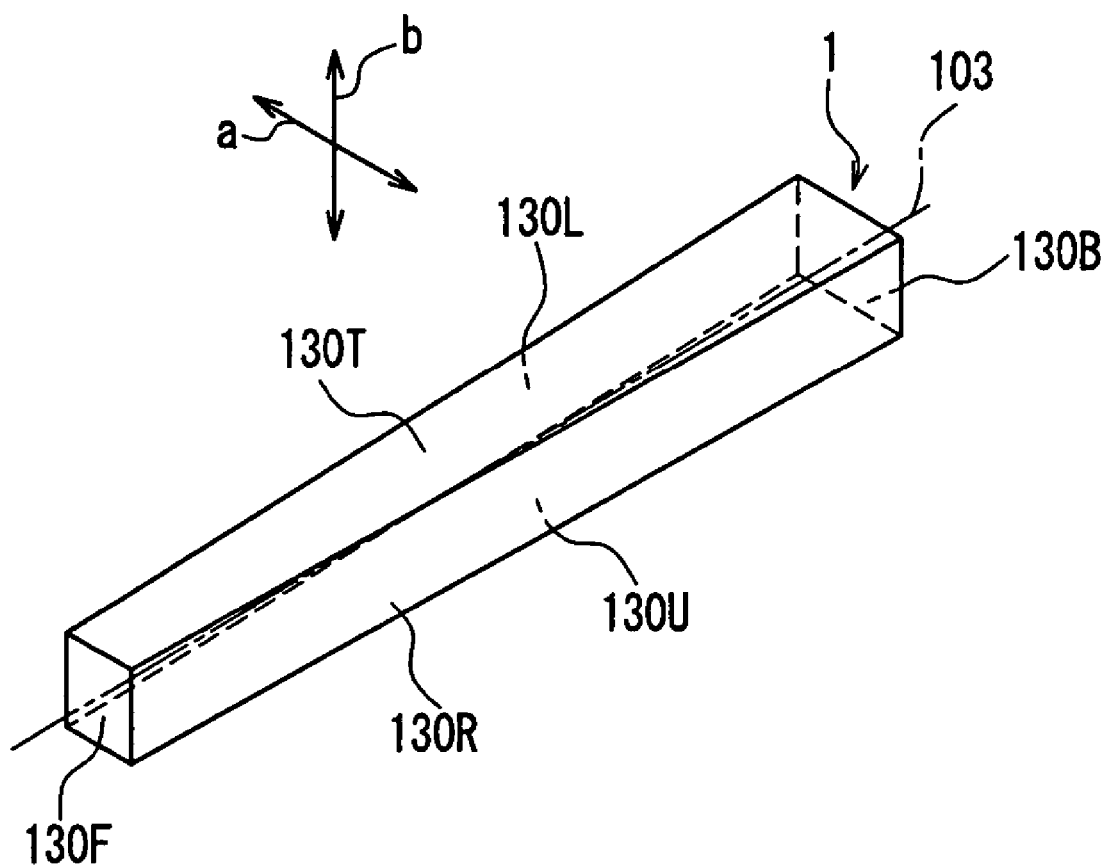
FIG. 2 is a perspective view of a rod integrator according to an embodiment of the present invention.
Figure 3A:
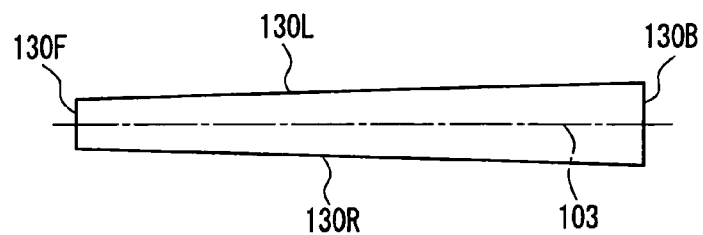
FIG. 3A is a top view of a rod integrator according to an embodiment of the present invention.
Figure 3B:
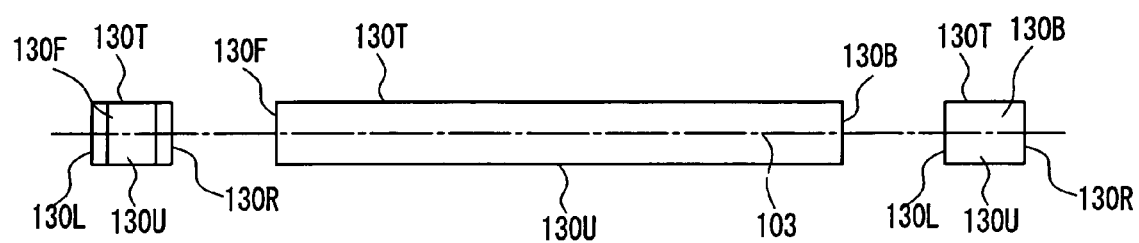
FIG. 3B is a lateral view of a rod integrator according to an embodiment of the present invention.

FIG. 2 is a perspective view and FIG. 3A is a top view of the rod integrator 1. FIG. 3B includes a lateral view and left and right lateral views. As shown in FIG. 2, the rod integrator 1 is a columnar optical element provided with an incident end face 130F at a front side, an exit end face 130B at a back side, and four side surfaces (130T, 130U, 130L, and 130R). Of the side surfaces that face each other, in one direction there are the side surfaces 130T and 130U, which are parallel planes (see FIG. 3B). In another direction, there are opposing side surfaces 130L and 130R, which are planes that face each other at an inclination of a predetermined angle such that both side surfaces 130L and 130R become farther apart from each other from the incident end face 130F toward the exit end face 130B (see FIG. 3A).

It should be noted that in this embodiment, "horizontal direction" refers to the long-side direction of the exit end face 130B (the direction of arrow "a" in FIG. 2) and "vertical direction" refers to the short-side direction of the exit end face 130B (the direction of arrow "b" in FIG. 2). This is also the same in embodiments below.

That is, when the rod integrator 1 is viewed in the vertical direction, the pair of side surfaces 130T and 130U are formed parallel, but when viewed in the horizontal direction, the pair of side surfaces 130R and 130L are arranged in a tapered shape such that they widen from the incident end face 130F toward the exit end face 130B.

In FIG. 1, the two light source portions of the pair of light source portions 101 and 102, which include the lamps 2 and the concave mirrors 3, are arranged in the horizontal direction (the direction of the arrow "a"). Furthermore, the light-emitting centers of the lamps 2 of the light source portions 101 and 102 are positioned in the vicinity of a first focal point of the concave mirrors 3.

Each of the light source portions 101 and 102 is arranged at an incident light angle θ to the incident end face 130F, and the light fluxes emitted from each of the lamps 2 are reflected by the concave mirrors 3, then converged and irradiated onto the vicinity of the incident end face 130F, that is, a second focal point of the concave mirrors 3. Here, "incident light angle" refers to the angle between a center line 103 of the rod integrator and the optical axes of the concave mirrors 3, which pass through apexes 3a of the concave mirrors 3. In the example shown in FIG. 1, the angle θ corresponds to the incident light angle.

It should be noted that when a reflective surface other than the concave mirror 3 is provided between the incident end face 130F and the lamps 2, "light ray intersecting the apex 3a of the concave mirror 3" refers to a light ray that intersects the apex 3a of the concave mirror 3 via the reflective surface and traveling through an intersecting point of the center line 103 and the incident end face 103F.

As described above, the incident end face 130F of the rod integrator 1 is arranged in the vicinity of the second focal point of the concave mirror 3. The incident light fluxes are totally reflected as appropriate by side surfaces of the rod integrator 1 in the vertical and horizontal directions and emitted from the exit end face 130B of the rod integrator 1.

The following is a description of the fundamental operation of the rod integrator 1.

Figure 4:
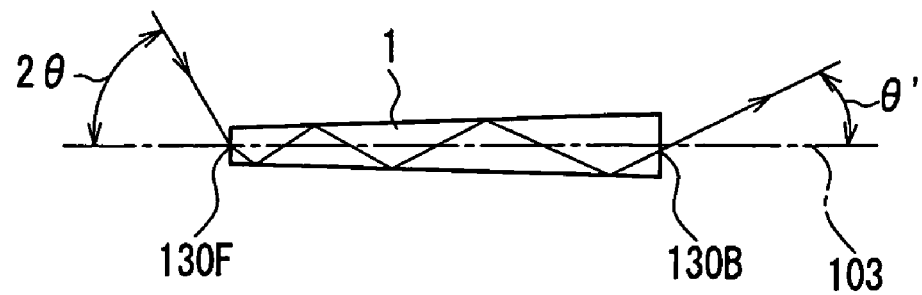
FIG. 4 is a top view of a rod integrator according to an embodiment of the present invention.
Figure 5:
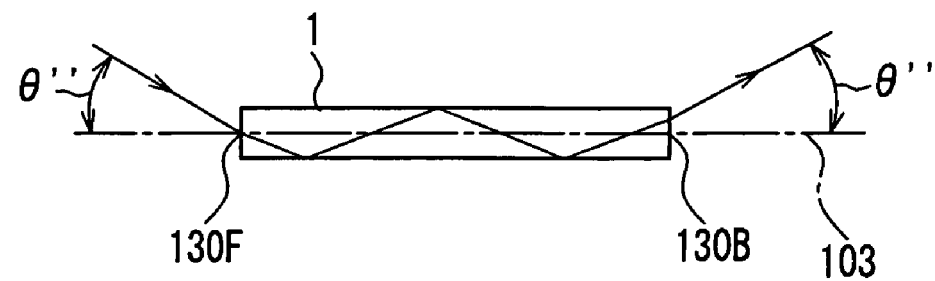
FIG. 5 is a lateral view of a rod integrator according to an embodiment of the present invention.

FIG. 4 is a top view of the rod integrator 1 showing the behavior of the incident light ray. FIG. 5 is a lateral view of the rod integrator 1 showing the behavior of the incident light ray. FIG. 4 shows how the incident light ray enters the incident end face 130F at a maximum angle (2θ), and is then reflected inside the rod integrator 1 and emitted from the exit end face 130B. Here, "maximum angle" refers to the maximum angle corresponding to one of the light sources of the light entering the incident end face 130F of the rod integrator 1.

More specifically, "maximum angle" refers to the angle between the light flux emitted from the most peripheral area of the effective aperture of the concave mirror 3 (effective diameter R in FIG. 1) and the center line 103 of the rod integrator 1 at the incident end face 130F. In the example shown in FIG. 1, the angle θM corresponds to the maximum angle.

Furthermore, "converging angle" here refers to the angle obtained by subtracting the incident angle from the maximum angle.

Given θMAX as the maximum angle, θE as the incident angle, and θc as the converging angle, the above relationship can be arranged in the following formula (1):

$$\theta MAX = \theta E + \theta c \qquad \text{Formula (1)}$$

In the example shown in FIG. 1, both the incident angle θE and the converging angle θc are θ and the maximum angle θMAX is 2θ. As shown in FIG. 4, an incident light ray at the maximum angle 2θ is emitted from the exit end face 130B at an angle θ' that is different from the maximum angle 2θ due to being totally reflected as appropriate by the pair of tapered surfaces of the rod integrator 1.

On the other hand, in FIG. 5, an incident light ray at the angle θ" is maintained and emitted at the same angle θ" as the incident angle due to being totally reflected as appropriate by the pair of parallel side surfaces of the rod integrator 1.

In FIGS. 2 and 3 for example, when the effective horizontal length of the exit end face of the rod integrator 1 is 7.6 mm, with a tapering angle of approximately 1.63734°, a length of 56.18624 mm, and five reflections at the side surfaces in the longitudinal direction, and using quartz (refractive index nd=1.45874) with good heat resistance and optical properties for the glass material of the rod integrator 1, then incident light with a maximum angle 2θ of 60° in FIG. 4 can be emitted at approximately 30°. Furthermore, in FIG. 5, incident light at 30° can be maintained and transmitted at an angle of 30°.

More specifically, when the incident angle of each of the concave mirrors is 30° as described above, according to formula (1), the maximum angle of the concave mirrors 3 is 60°. When two concave mirrors 3 are arranged in the horizontal direction as in the configuration in FIG. 1, light is incident at the exit end face 130F of the rod integrator 1 at the maximum angle of 120°, but the maximum emission angle of the exit end face 130B can be set to approximately 60°.

On the other hand, when viewed in the vertical direction, the maximum value of the angle of incident light at the incident end face even when there are two concave mirrors 3 are arranged is no different from when there is a single concave mirror 3. The maximum value is 60°, with the angle being maintained and transmitted while light is reflected between the parallel surfaces to be emitted at 60°.

In this way, even when the maximum value of the angles at the incident end face 130F of light incident to the rod integrator 1 is 120° in the horizontal direction and 60° in the vertical direction, the emission angle at the exit end face 130B can be set to approximately 60° in both the horizontal and vertical directions.

In other words, even when the maximum value in the horizontal direction of the converging angle of the light flux incident at the incident end face 130F is larger than the maximum value in the vertical direction, the divergence angle of the light flux emitted from the exit end face 130B can be set such that the maximum value in the horizontal direction and the maximum value in the vertical direction are approximately equal.

Furthermore, color display can be achieved by arranging in the vicinity of the emission portion of the rod integrator 1 a color wheel (not shown in FIG. 1) constituted by dichroic filters that allow the transmission of at least the three primary colors red, blue, and green, and that rotates to separate white light on a time-division basis.

It should be noted that a property of the thin films used in coating the dichroic mirrors that constitute the color wheel is that they usually are rated to support an incident angle of 30°, so that in this case, the desired angle of the incident angle of the concave mirrors 3 is 30°.

Further still, if the angles of the incident light rays are different, the number of times the light is totally reflected as appropriate on the respective pairs of side surfaces in the horizontal direction and vertical direction of the rod integrator 1 will be different. And since they are merged at the exit face, the light rays are superimposed at the exit face even when there is an uneven illumination distribution at the incident face. A result of this is that it is possible to obtain an illumination light flux at the exit end face 130B of the rod integrator 1 that has superior uniformity and that has a form that is approximately equivalent to a desired illumination range.

However, although it is generally true that better uniformity can be achieved with a larger number of reflections, it must be emphasized that it is necessary to determine the form of the rod integrator 1 giving consideration to the fact that the maximum exit angle depends on the taper angle and the number of reflections of the incident light rays.

Figure 6:
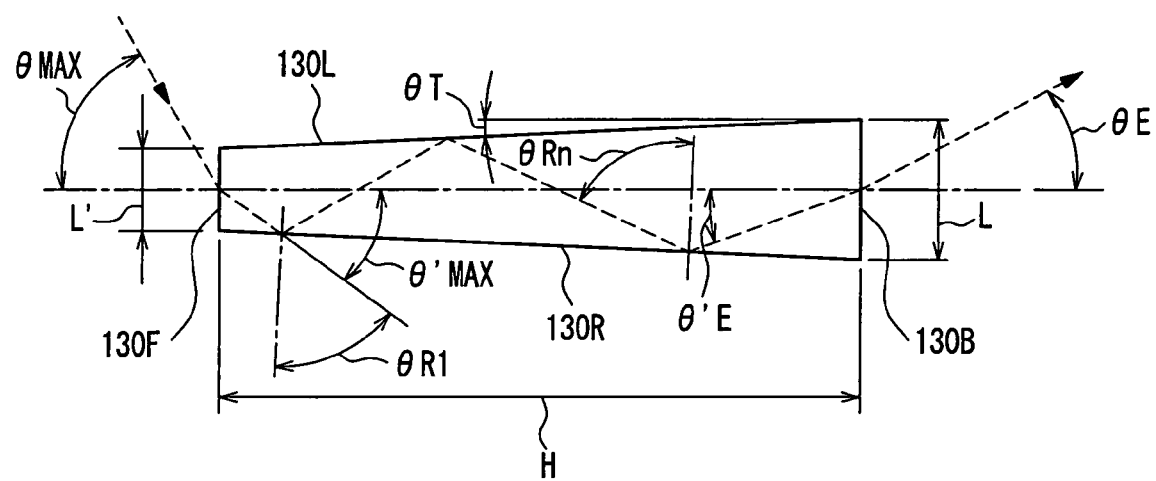
FIG. 6 is a diagram for explaining the determination a length H of a rod integrator according to an embodiment of the present invention.

The following is a description of determining the form of the rod integrator 1 using FIG. 6. FIG. 6 is a top view of the rod integrator 1. In determining the form of the rod integrator 1, although the details will be described in order with reference to the formulae, it is necessary to determine the number of reflections on the tapered surfaces 130R and 130L of the incident light ray with the maximum angle of the light incident on the incident end face 130F (hereafter, "number of reflections") and derive a tapering angle θT and a horizontal length L' of the incident end face 130F.

Further still, values for a horizontal length L of the exit end face 130B, the maximum angle of the light source θMAX, and a refractive index nd of the rod integrator 1 are required, but these are constants. This is because the length L is determined according to such factors as the form of the light valve, the maximum angle θMAX is determined by the incident angle of each light source portion, and the refractive index nd is determined by the material that constitutes the rod integrator. Furthermore, the value for the emission angle θE is also required, but this value is a requirement determined according to the maximum angle θMAX, so this too is a constant.

In FIG. 6, if the emission angle immediately after refraction of the incident light on the incident end face 130F with the maximum angle θMAX (degrees) is given as θ'MAX (degrees), the following formula (2) is true according to Snell's law:

$$1 \times \sin \theta MAX = nd \times \sin \theta MAX' \qquad \text{Formula (2)}$$

Furthermore, if the emission angle immediately before refraction of the incident light on the exit end face 130B with the maximum angle θMAX is given as θ'E (degrees), and the emission angle immediately after refraction on exit end face 130B is given as θE (degrees), the following formula (3) is also true according to Snell's law:

$$1 \times \sin \theta E = nd \times \sin \theta' E \qquad \text{Formula (3)}$$

Furthermore, as shown in FIG. 6, when the initial incident angle θR1 (degrees) is set with the normal lines of the reflective surfaces 130R and 130L as a reference, θR1 can be expressed by the following formula (4):

$$\theta R1 = 90 - (\theta' MAX - \theta T) \qquad \text{Formula (4)}$$

Furthermore, as shown in FIG. 6, when the incident angle θRn (degrees) for the number of reflections n (n=2, 3, 4, . . . ) is set with the normal lines of the reflective surfaces 130R and 130L as reference, θRn can be expressed by the following formula (5):

$$\theta Rn = \theta R1 + 2 \times \theta T \times (n-1) \quad \text{Formula (5)}$$

When θR1 is eliminated from the formulae (4) and (5), the following formula (6) can be obtained:

$$\theta Rn = 90 - (\theta' MAX - \theta T) + 2 \times \theta T \times (n-1) \quad \text{Formula (6)}$$

On the other hand, the reflective angle θ'E before refraction at the exit end face 130B is expressed by the following formula (7):

$$\theta' E = 90 - \theta Rn - \theta T \quad \text{Formula (7)}$$

The following formula (8) can be obtained by transforming the formula (7):

$$\theta Rn = 90 - \theta T - \theta' E \quad \text{Formula (8)}$$

Since θRn in both formula (6) and (8) are equivalent, the following formula (9) can be found, enabling θT to be obtained:

$$\theta T = (\theta' MAX - \theta' E)/2n \quad \text{Formula (9)}$$

On the other hand, keeping in mind that before and behind illumination optical systems as known in the art, the product of the surface area of the illumination area and the solid angle of the illuminating light is constant, the length L' (mm) in the horizontal direction of the incident end face 130F can be expressed as follows since similarly the product of the surface area of the exit face of the rod integrator 1 and the emission angle of the illuminating light is equivalent to the product of the surface area of the transmissive light valve 6 and the solid angle of the illuminating light.

$$\pi \times L' \times V \times \sin \theta MAX \times \sin \theta V = \pi \times L \times V \times \sin \theta E \times \sin \theta V$$

Note that V (mm) is the length in the vertical direction of the rod integrator, θV (degrees) is the maximum incident angle in the vertical direction, and L (mm) is the length in the horizontal direction of the exit end face 130B.

Based on this relationship, L' can be determined using the following formula (10):

$$L' = L \times \sin \theta E / \sin \theta MAX \quad \text{Formula (10)}$$

In this way, by determining the tapering angle θT and the length L' in the horizontal direction of the incident end face 130F, the length H (mm) in the longitudinal direction of the rod integrator 1 is determined with the following formula (11):

$$H = (L - L')/2 \tan \theta T \quad \text{Formula (11)}$$

As described above, if the length L, the number of reflections n, the maximum angle θMAX, and the emission angle θE are determined, it is possible to derive the length U, the tapering angle θT, and the length H in the longitudinal direction, and thus it is possible to determine the form of the rod integrator 1.

It should be noted that, as described above in regard to the form of the rod integrator 1, it is possible to derive theoretical values by substituting desired numerical values in the above-described formulae. However, adjustments may be required for the theoretical value of the length H when consideration is given to the elliptical form of the concave mirror 3, the tubular shape of the lamp 2, the light distribution properties of the lamp, and the intensity distribution of the arc.

Furthermore, the calculated values have a tolerance range. It is preferable that θT (degrees) in formula (9) is in the following range:

$$[(\theta' MAX - \theta')/2n] - 1 \leq \theta T \leq [(\theta' MAX - \theta')/2n] + 1$$

Furthermore, it is preferable that θT (degrees) is within the range of ±5' (minutes) of the calculated value. Within this range, production is possible within the tolerance of polishing.

The following is a description of calculation examples using the above-described formulae. For example, presently it is common to use elliptical concave mirrors with a converging angle (incident angle) of approximately 30°, which gives importance to improving brightness and miniaturization. For this reason, two such elliptical concave mirrors are used for the rod integrator 1 according to the calculation examples. In this case, the maximum angle θMAX according to formula (1) is 60°. Given that the required value for the emission angle θE is 30°, a tapering angle θT of 1.63734° is found based on the formulas (2) to (9).

On the other hand, given that, in accordance with the size of the light valve, the length L of the side surface in the horizontal direction of the exit end face 130B is 7.6 mm, based on the formula (10) it is possible to determine a length L' of the incident end face 130F of 4.38786 mm.

Furthermore, based on the formula (11), it is possible to determine a length H of 56.1862490 mm.

However, note that this was calculated using 5 as the number of reflections and with the refractive index nd of the rod integrator 1 as 1.45874.

The following tables show changes in the tapering angle θT, the length L', and the length H when the number of reflections n and the maximum angle θMAX are changed. Table 1 shows the results of calculating the tapering angle θT from θMAX and the number of reflections n. Table 2 shows the results of calculating the length L' of the incident end face 130F from θMAX and the exit end face length L. Table 3 shows the results of calculating the length H by varying the number of reflections n and the maximum angle θMAX using the tapering angle θT, the length L of the exit end face 130B, and the length L' of the incident end face 130F.

In these calculations, the nd of the rod integrator 1 is taken to be 1.45874 and the emission angle θE at the exit end face 130B is taken to be

TABLE 1

| nd = 1.45874 | | | θMAX | | | | |
|---|---|---|---|---|---|---|---|
| | θE = 30° | | 40° | 45° | 50° | 55° | 60° |
| Tapering angle θT (degrees) | Number of reflections n | 2 | 1.52497 | 2.23752 | 2.90813 | 3.52942 | 4.09335 |
| | | 3 | 1.01665 | 1.49168 | 1.93876 | 2.35295 | 2.7289 |
| | | 4 | 0.76248 | 1.11876 | 1.45407 | 1.76471 | 20.4668 |
| | | 5 | 0.60999 | 0.89501 | 1.16325 | 1.41177 | 1.63734 |
| | | 6 | 0.50832 | 0.74584 | 0.96938 | 1.17647 | 1.36445 |
| | | 7 | 0.43571 | 0.63929 | 0.8309 | 1.00841 | 1.16953 |

TABLE 2

| L = 7.6 mm | | θMAX | | | |
|---|---|---|---|---|---|
| θE = 30° | 40° | 45° | 50° | 55° | 60° |
| L' (mm) | 5.91175 | 5.37401 | 4.96055 | 4.63894 | 4.38786 |

TABLE 3

| nd = 1.45874 | | | θMAX | | | | |
|---|---|---|---|---|---|---|---|
| | θE = 30° | | 40° | 45° | 50° | 55° | 60° |
| H (mm) | Number of reflections n | 2 | 31.70776 | 28.48578 | 25.9788 | 24.00417 | 22.44236 |
| | | 3 | 47.56772 | 42.74074 | 38.98668 | 36.03155 | 33.69542 |
| | | 4 | 63.42716 | 56.99329 | 51.99092 | 48.05396 | 44.942 |
| | | 5 | 79.28486 | 71.24471 | 64.99401 | 60.0742 | 56.18624 |
| | | 6 | 95.14387 | 85.49597 | 77.99569 | 72.0938 | 67.4291 |
| | | 7 | 111.0001 | 99.74702 | 90.99696 | 84.11198 | 78.67113 |

The light flux emitted from the rod integrator 1 determined in this way illuminates the transmissive light valve 6 via a relay lens system 4, which is configured by at least one lens, and a field lens 5.

The transmissive light valve 6 displays an image based on an electric signal that is output from a drive circuit (not shown). The image displayed on the transmissive light valve 6 is magnified by the projection lens 7 and projected onto a screen (not shown).

With the present embodiment, it is possible to achieve control such that while the divergence angle of light in the vertical direction of the exit end face 130B is kept approximately equivalent to the divergence angle of light in the vertical direction of the incident end face 130F (see FIG. 5), the divergence angle of light in the horizontal direction of the exit end face 130B is different from the divergence angle (maximum angle) of light in the horizontal direction of the incident end face 130F (see FIG. 4).

In this way, for example, in regard to light with a maximum angle at the incident end face 130F of 60° (2θ in FIG. 4) and a divergence angle of 30° in the vertical direction with respect to the center line 103 (see θ" in FIG. 5), it is possible to set the divergence angle of light in the horizontal direction of the exit end face 130B (θ' in FIG. 4) and the divergence angle of light in the vertical direction (θ" in FIG. 5) to the same angle of 30°.

Accordingly, the divergence angle of light emitted from the exit end face 130B when using two light sources has a maximum angle in the horizontal direction and a maximum angle in the vertical direction that is the same angle of 60°, and it is possible to obtain a light having high brightness and uniformity. In regard to brightness, it is possible to achieve a brightness that is approximately 1.7 to 1.8 times that achievable with a single light source portion. Furthermore, by alternating the use of single light source portions, the time until the light source of each light source portion expires is increased, and therefore it is possible to achieve approximately double the light source life compared to a device with one light source.

It should be noted that the present embodiment was described using an example of a projection image display device, but if using a device provided with at least, in the direction in which light proceeds, the structure from the light source 2 to the relay lens system 4 as an illuminator, it is possible to achieve an illuminator that can emit a light having high brightness and uniformity.

Embodiment 2

Figure 7:
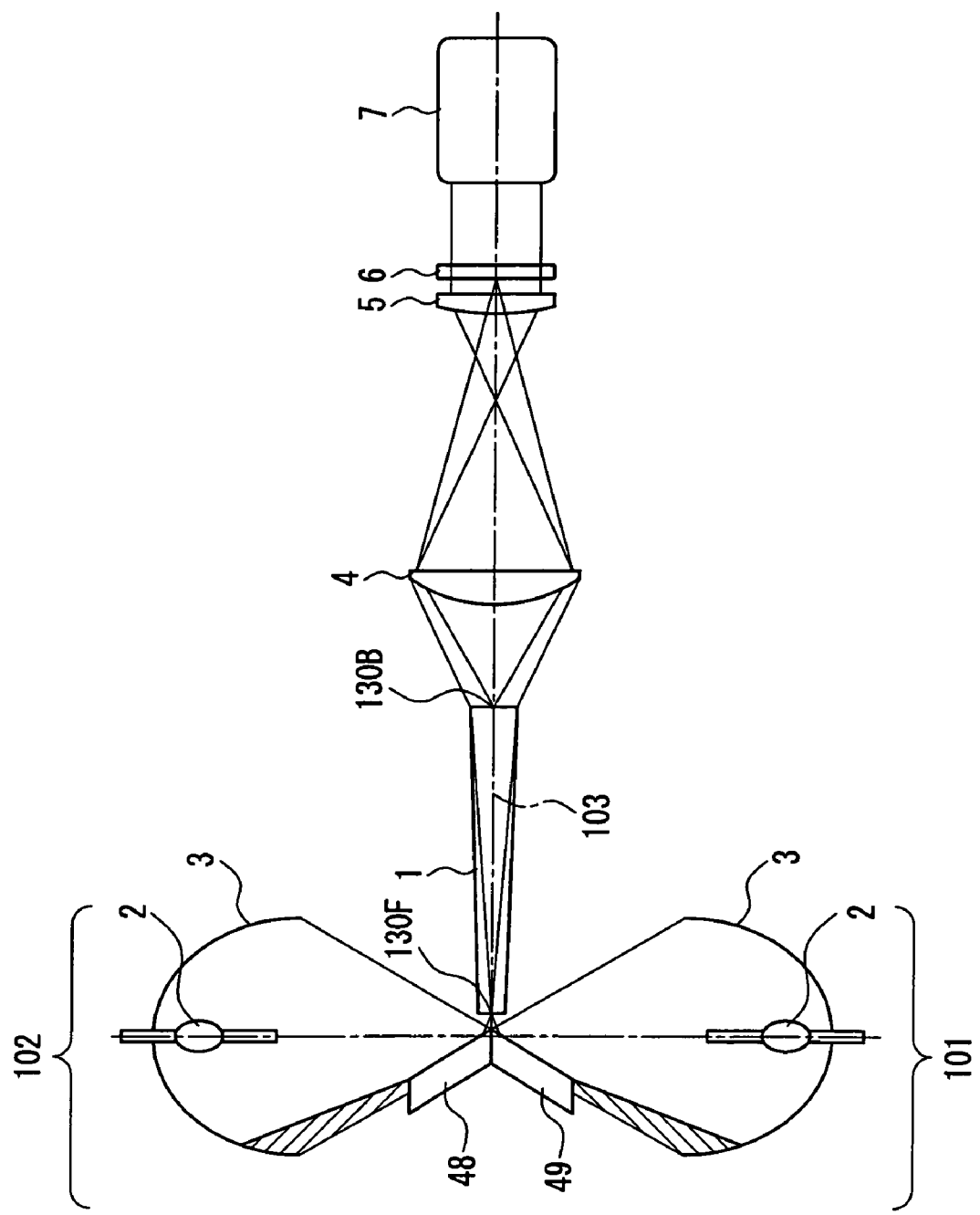
FIG. 7 is a top view of a conceptual diagram of an optical system according to Embodiment 2 of the present invention.

FIG. 7 is a conceptual diagram of an optical system of a projection image display device according to Embodiment 2. The same reference numerals are used for items with the same structure as in the projection image display device according to Embodiment 1 shown in FIG. 1, and detailed description of such items is omitted here. Compared to the structure shown in FIG. 1, the arrangement of the two light source portions 101 and 102 is different in the structure shown in FIG. 7 and a first reflector 48 and a second reflector 49 are provided.

In the present embodiment, synthesizing prisms 48 and 49 are used as the first and second reflector. The synthesizing prisms 48 and 49 are formed from a glass material with excellent heat resistance and their reflective surfaces are coated with a multi-layer dielectric film with an excellent reflectance ratio.

It is also possible to use a reflective mirror coated with a multi-layer dielectric film. However, when using a reflective mirror or prism on which aluminum or silver is deposited, it is necessary to insert a filter that removes ultraviolet light at a stage preceding the synthesizing portion.

The first reflector 48 guides light from the light source portion 102 to the incident end face 130F of the rod integrator 1 and the second reflector 49 guides light from the light source portion 101 to the incident end face 130F of the rod integrator 1. When viewed from above, the first reflector 48 and the second reflector 49 are arranged such that they form a ">"-shape opening toward the side opposite to the incident end face 130F of the rod integrator 1 (which is substantially a V shape when viewed from the incident end face 130F). By being arranged in this way, the inclination angles of the reflective surfaces of the first reflector 48 and the second reflector 49 are half of the maximum angle.

In the present embodiment, by using the first reflector 48 and the second reflector 49, there is a greater level of freedom in arranging the light source portions 101 and 102, and in the example of FIG. 7, the light source portions 101 and 102 are arranged opposing each other in the horizontal direction. That is, both light sources 2 and concave mirrors 3 face each other in the horizontal direction. The light fluxes emitted from the light sources 2 are reflected by the concave mirrors 3, then respectively reflected by the first reflector 48 and the second reflector 49. The reflected light is converged and irradiated at angles θ, which are equivalent with respect to the center line 103 of the rod integrator, in the vicinity of the incident end face 130F, that is, in the vicinity of the second focal point of the concave mirrors 3.

Figure 8:
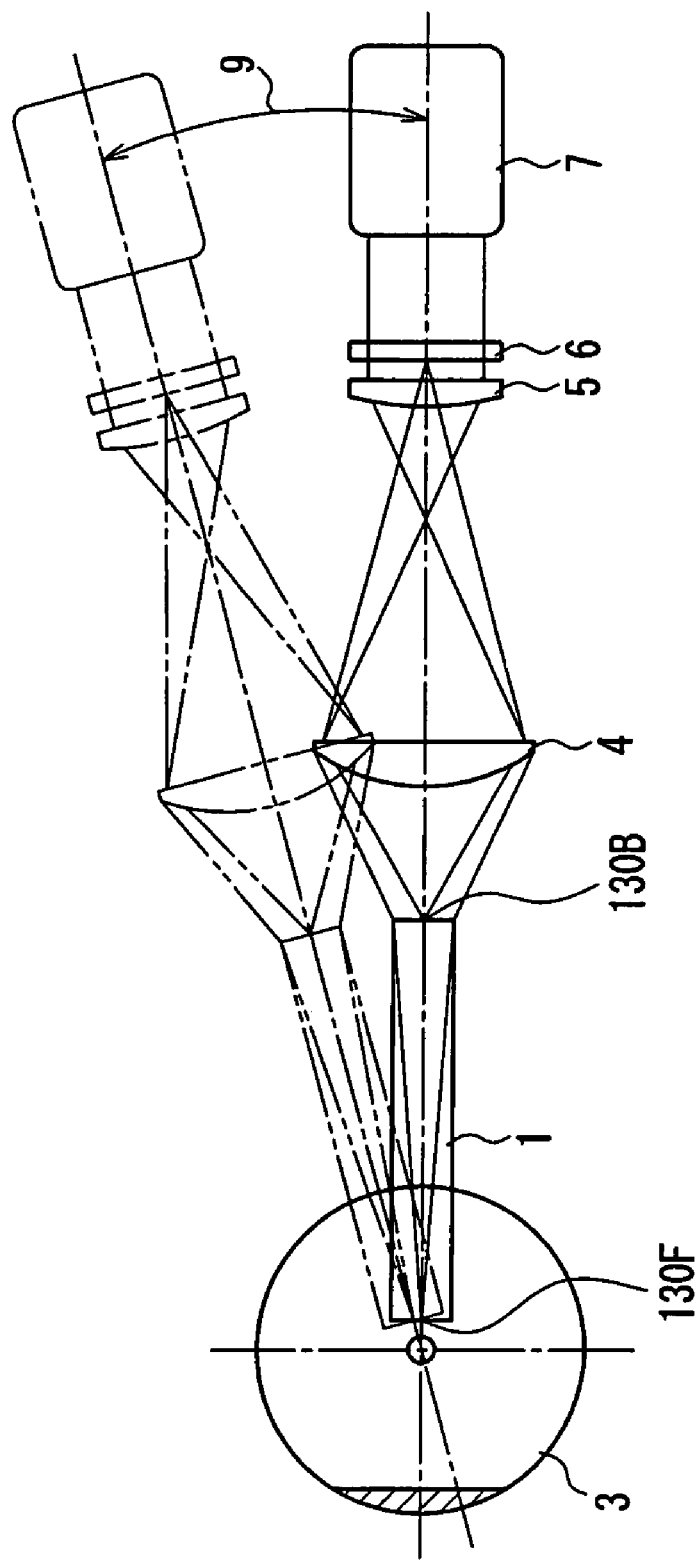
FIG. 8 is a lateral view of a conceptual diagram of an optical system according to Embodiment 2 of the present invention.

FIG. 8 is a lateral view of a conceptual diagram of an optical system according to the present embodiment. The dotted line portion shows a state in which an installation adjustment angle 9 is adjusted in the elevation angle direction in accordance with the position of a screen (not shown). Ordinarily, the life of a light source is shortened by the influence of heat and other factors when it is slanted in the optical axis direction. In the present embodiment, since the optical axes of the concave mirrors 3 of the two light source portions 101 and 102 and the optical axis of the projection lens 7 are arranged perpendicularly, the optical axes of the light source portions are not slanted when the installation adjustment angle 9 is changed.

In this way, with the present embodiment, even when the light sources 2 and the concave mirrors 3 are rotated around their optical axis by the angle of the installation adjustment angle 9, the position of the optical axes does not change, and the horizontal lighting is continued without a change in the specifications. For this reason, even if the device itself is installed slanted, there is little chance of harming the life of the light source, and a highly reliable device can be achieved.

Embodiment 3

Figure 9:
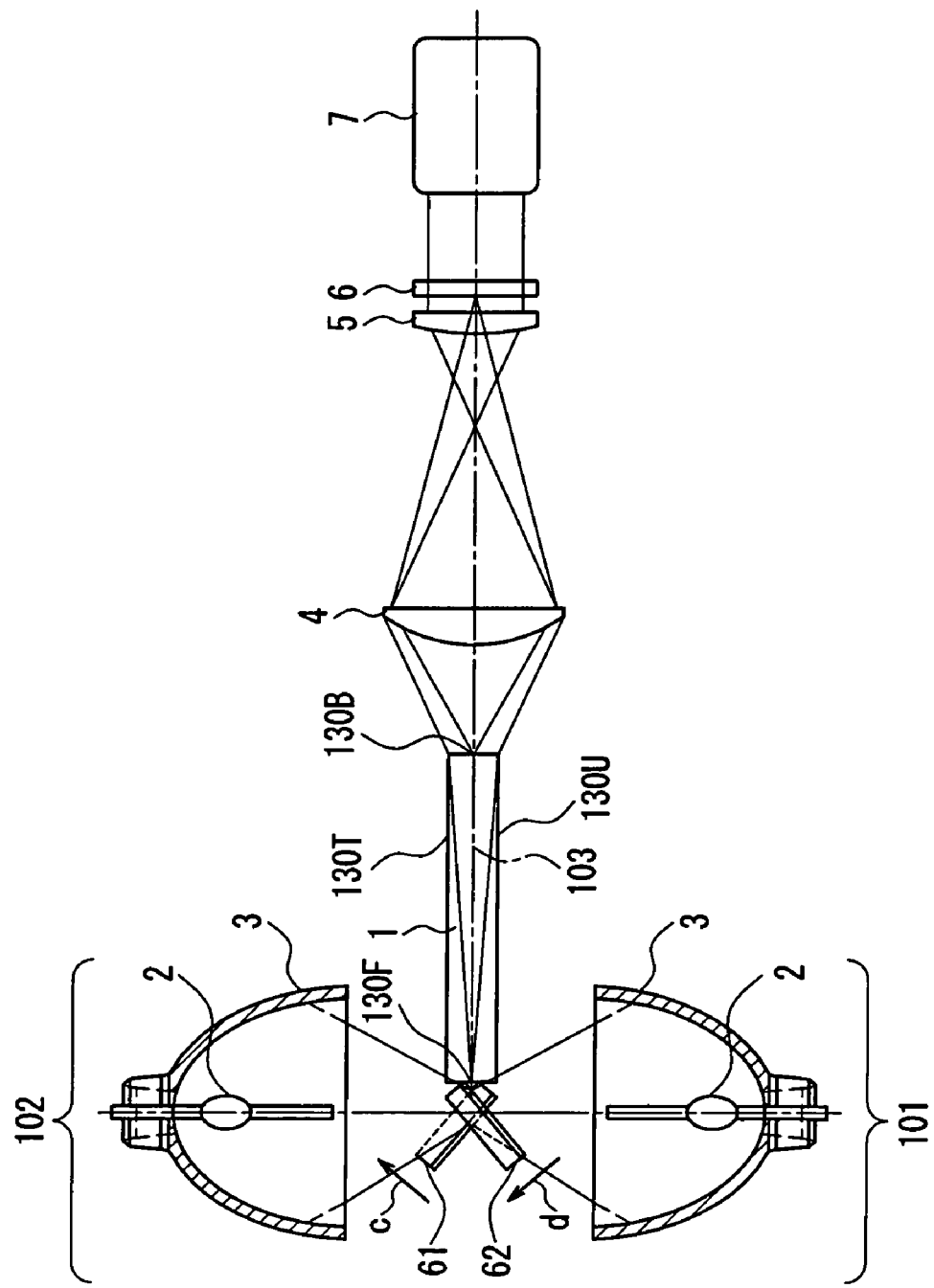
FIG. 9 is a top view of a conceptual diagram of an optical system according to Embodiment 3 of the present invention.

FIG. 9 is a conceptual diagram showing an optical system of a projection image display device according to Embodiment 3. The same reference numerals are used for items with the same structure as in the projection image display device according to Embodiment 1 shown in FIG. 1, and detailed description of such items is omitted here. Note, however, that the light source portions 101 and 102 are shown as more concrete objects, and the concave mirrors 3 are shown as cross sections (same for following diagrams).

Compared to the structure shown in FIG. 1, the arrangement of the two light source portions 101 and 102 is different in the structure shown in FIG. 9 and a synthesizing mirror 61 (first reflector) and a synthesizing mirror 62 (second reflector) are provided. The synthesizing mirrors 61 and 62 are reflection mirrors coated with a multi-layer dielectric film for example.

Furthermore, the structure of the rod integrator 1 itself is the same as in Embodiment 1, but in contrast to the arrangement in Embodiment 1, the rod integrator 1 of the present embodiment is rotated 90° around the center axis 103.

Accordingly, when using in Embodiment 3 the definitions of "vertical direction" and "horizontal direction" as described in Embodiment 1, the horizontal direction in the paper plane in FIG. 9 is the "vertical direction" and the direction that is vertical to the paper plane is the "horizontal direction."

The light sources 2 and the concave mirrors 3 face each other in the vertical direction. Furthermore, the reflective surfaces of the synthesizing mirrors 61 and 62 respectively face the lamps 2. Furthermore, the reflective surfaces of the synthesizing mirrors 61 and 62 are respectively inclined 45° in the vertical direction, and the directions of inclination of the synthesizing mirror 61 and the synthesizing mirror 62 are reversed. In this way, the light fluxes from the lamps 2 are turned 90° by the reflective surface of the synthesizing mirror 61 and the reflective surface of the synthesizing mirror 62 and guided to the incident end face 130F of the rod integrator 1.

Furthermore, the reflective surface of the synthesizing mirror 61 is inclined 15° (the direction of arrow "c" in FIG. 9), which is half the converging angle of the concave mirror 3, in the horizontal direction, and the reflective surface of the synthesizing mirror 62 is inclined 15° (the direction of arrow "d" in FIG. 9), which is half the converging angle of the concave mirror 3, in the horizontal direction.

Figure 10A:
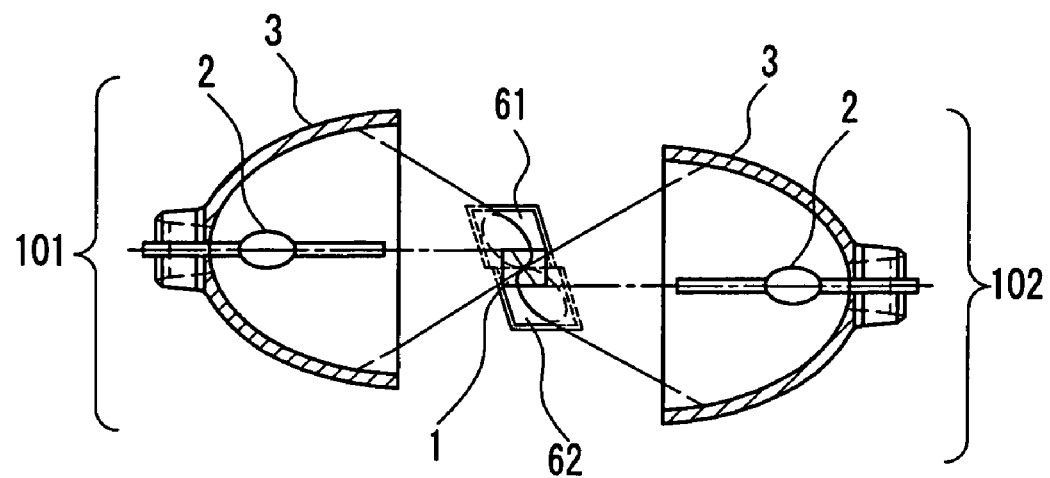
FIG. 10A is a detailed diagram of light source portions and synthesizing portions according to Embodiment 3 of the present invention.

FIG. 10A shows the device shown in FIG. 9 as viewed from the side of the exit end face 130B of the rod integrator 1. As shown in this diagram, the light source portions 101 and 102 are arranged such that the optical axis of the concave mirror 3 of the light source portion 101 and the optical axis of the concave mirror 3 of the light source portion 102 do not intersect with the center line 103 of the rod integrator 1. That is, both of these optical axes are separated such that they are parallel, and neither of the optical axes intersects with the center line 103 of the rod integrator 1. The arrangement of the synthesizing mirrors 61 and 62 corresponds to the arrangement of these light source portions 101 and 102.

Figure 10B:
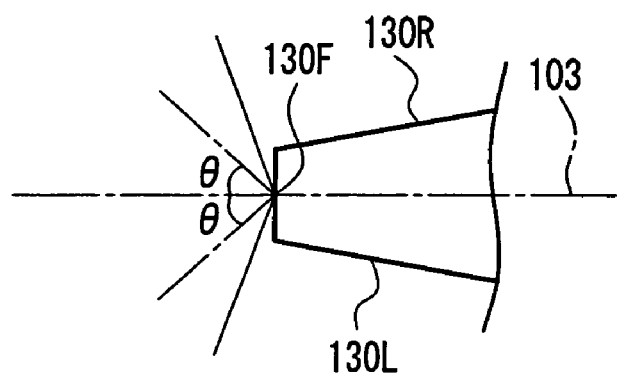
FIG. 10B is an enlarged view of an incident end face of a rod integrator according to Embodiment 3 of the present invention.
Figure 13:
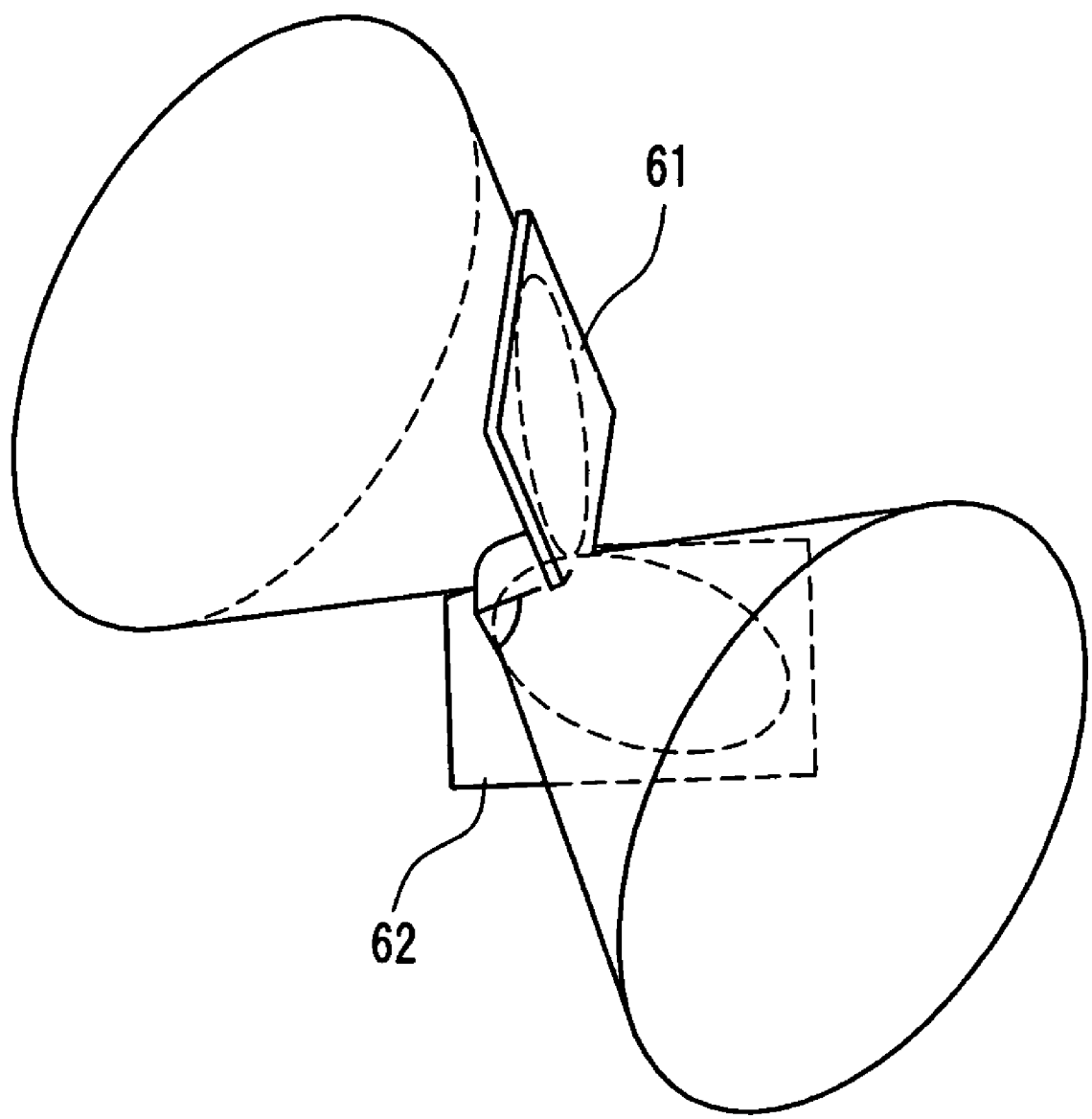
FIG. 13 is a perspective view showing an arrangement of mirrors according to an embodiment of the present invention.

FIG. 10B is a lateral view showing the vicinity of the incident end face 130F of the rod integrator 1. And FIG. 13 is a perspective view of an example arrangement of the synthesizing mirrors 61 and 62 that is shown in order to facilitate understanding of the arrangement of the synthesizing mirrors 61 and 62. Using these drawings, it is evident that the light fluxes from the light source portions 101 and 102 are reflected by the inclined surfaces of the synthesizing mirrors 61 and 62.

Due to the slant of the reflective surfaces of the synthesizing mirrors 61 and 62 and the displacement in the horizontal direction of the two lamps 2 on the left and right of the synthesizing mirrors 61 and 62, the light from the lamps 2 is reflected by the synthesizing mirrors 61 and 62, then converged and irradiated at incident angles θ (30°), which are equivalent with respect to the center line 103, in the vicinity of the incident end face 130F, that is, in the vicinity of the second focal point of the concave mirrors 3.

In this case, light of a maximum angle 2θ (60°) respectively from the concave mirrors 3 is incident at the incident end face 130F, such that light of a maximum angle of 120° is incident at the incident end face 130F on rod integrator 1. Since the tapered surfaces of the rod integrator 1 in the present embodiment are arranged in the horizontal direction, light of the maximum 120° is reflected by the tapered surfaces such that it is possible to control the maximum emission angle at the exit end face 130B to approximately 60° in the same way as in Embodiment 1.

As described above, in the present embodiment, the light source portions 101 and 102 are arranged such that the optical axis of the concave mirror 3 of the light source portion 101 and the optical axis of the concave mirror 3 of the light source portion 102 do not intersect with the center line 103 of the rod integrator 1, and the synthesizing mirrors 61 and 62 are arranged in correspondence to this. This eliminates the areas that cannot be used by light rays (hatched areas in FIG. 7) caused by the synthesizing prisms in Embodiment 2, and it is therefore possible to achieve a device that can provide an image of even better brightness and uniformity.

Furthermore, by arranging optical axes of the concave mirrors of the two light source portions vertically to the optical axis of the projection lens, the danger of light source damage is reduced even when the device is installed inclined, and like in Embodiment 2, a high reliability can be achieved.

Embodiment 4

Figure 11:
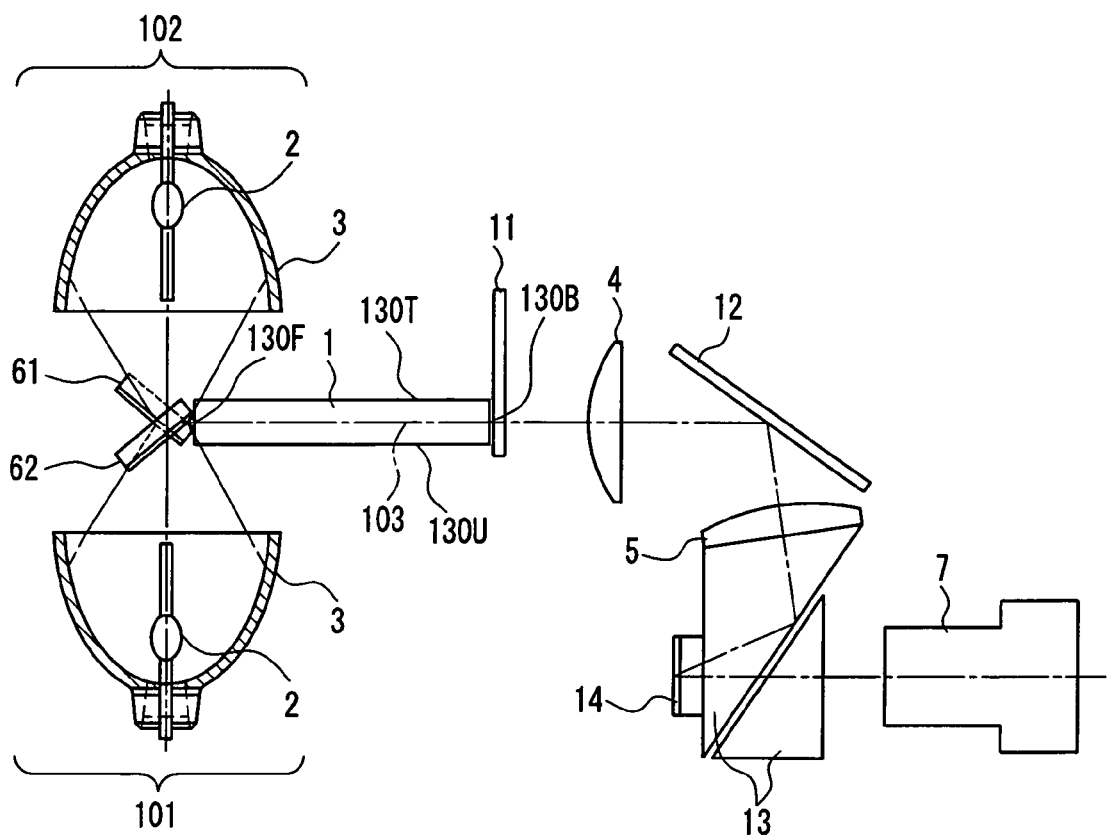
FIG. 11 is a top view of a conceptual diagram of an optical system according to Embodiment 4 of the present invention.

FIG. 11 is a conceptual diagram showing an optical system of a projection image display device according to Embodiment 4. The same reference numerals are used for items with the same structure as in the projection image display device according to Embodiment 1 shown in FIG. 1, and detailed description of such items is omitted here. FIG.

Figure 12:
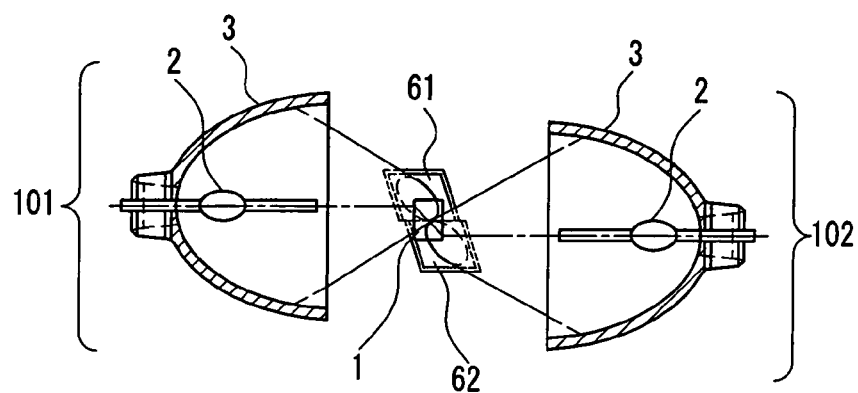
FIG. 12 is a detailed diagram of light source portions and synthesizing portions according to Embodiment 4 of the present invention.

12 shows the device shown in FIG. 11 as viewed from the side of the exit end face 130B of the rod integrator 1. As shown in FIGS. 11 and 12, the structure from the light sources 2 to the rod integrator 1 in the order of progression of the light fluxes is the same as in Embodiment 4.

As shown in FIG. 11, the light flux emitted from the rod integrator 1 illuminates a reflective light valve 14 via a color wheel 11, a relay lens system 4 constituted by at least one lens, a total reflection mirror 12, a field lens 5, and a total reflection prism 13. Modulated light that forms an optical image is emitted by the light valve 14. The light flux from the light valve 14 reaches the projection lens 7 via the total reflection prism 13 and the projection lens 7 projects the optical image formed by the light valve 14.

Color display is made possible by the color wheel 11 arranged in the vicinity of the exit end face 130B of the rod integrator 1. The color wheel 11 is constituted by dichroic filters that allow the transmission of at least the three primary colors red, blue, and green, and rotates to separate white light on a time-division basis. A property of the thin films used in coating the dichroic mirrors that constitute the color wheel 11 is that they are commonly rated to support an incident angle of 30°, so that in this case, the desired angle of the incident angle is 30°.

The total reflection mirror 12 and the total reflection prism 13 are configured as means for turning light and are arranged such that the light flux emitted from the rod integrator 1 is turned with the center line 103 as the center when viewed from the direction of the center line 103 of the rod integrator. The angle of turning is determined to match the arrangement of the reflective light valve 14 and is 90° in the example of FIG. 11.

With this configuration, the illuminating light emitted from the exit end face 130B of the rod integrator 1 illuminates the reflective light valve 14 in a state in which it is turned 90°. The turning angle can be adjusted by setting the angle of the boundary with the atmosphere of the total reflection prism 13 that uses total reflection to guide the light flux to the reflective light valve 14 and the angle of the total reflection mirror 12 to desired angles.

The means for turning light are provided in this way to improve the convergence efficiency. For example, although there is no problem when the reflective light valve 14 has a sufficient surface area, that is, when it is possible to ensure a short-side length of the exit face of the rod integrator 1 of a sufficient length, to miniaturize the set, the light valve also must be miniaturized, and when making the converging angle of the illuminating light appropriate for an F-number of 2 using a reflective light valve with a diagonal length of 17.78 mm for example, it is necessary for the short-side length of the exit face of the rod integrator 1 to be approximately 6 mm. In this case, applying a tapering angle based on an approximately 6-mm short-side length of the exit face further shortens the length of the incident face and reduces the convergence efficiency.

In order to solve this issue, it is possible to improve the efficiency of light utilization of the reflective light valve greatly and achieve an illuminator that has even higher brightness and uniformity, and it is possible to achieve a projection image display device provided with this illuminator, by providing a tapering angle on the long-side length of the rod integrator and improving the convergence efficiency and by implementing a configuration in which the illuminating light is turned by the total reflection mirror 12 and the total reflection prism 13 to match the arrangement of the reflective light valve.

Note, however, that while it is widely known that before and behind illumination optical systems, the product of the surface area of the illumination area and the solid angle of the illuminating light is constant, the product of the surface area of the exit face of the rod integrator 1 and the emission angle of the illuminating light is of course equivalent to the product of the surface area of the transmissive light valve 14 and the solid angle of the illuminating light.

Furthermore, as shown in FIG. 12, the light source portions 101 and 102 are arranged such that, as in Embodiment 3, the optical axis of the concave mirror 3 of the light source portion 101 and the optical axis of the concave mirror 3 of the light source portion 102 do not intersect with the center line 103 of the rod integrator 1, and the synthesizing mirrors 61 and 62 are arranged in correspondence to this. This makes it possible to achieve an image with higher brightness and uniformity.

When the rod integrator is rotated around the center line 103 and arranged as in the present embodiment, the arrangement of the two left and right lamps 2 also changes in accordance with the rotation angle. Even in this case, if the light source portions 101 and 102 and the synthesizing mirrors 61 and 62 shown in FIG. 12 are rotated around the center line 103 while maintaining their positional relationship, it is possible to accommodate the arrangement of the above-described rotated rod integrator.

Furthermore, the reflective light valve 14 is constituted by a digital mirror device, which is an aggregation of micromirrors, and displays an image based on an electric signal that output from a drive circuit (not shown). The image displayed by the reflective light valve 14 is magnified and projected via the total reflection prism 13 and the projection lens 7 and projected onto a screen (not shown).

Embodiment 5

Figure 14A:
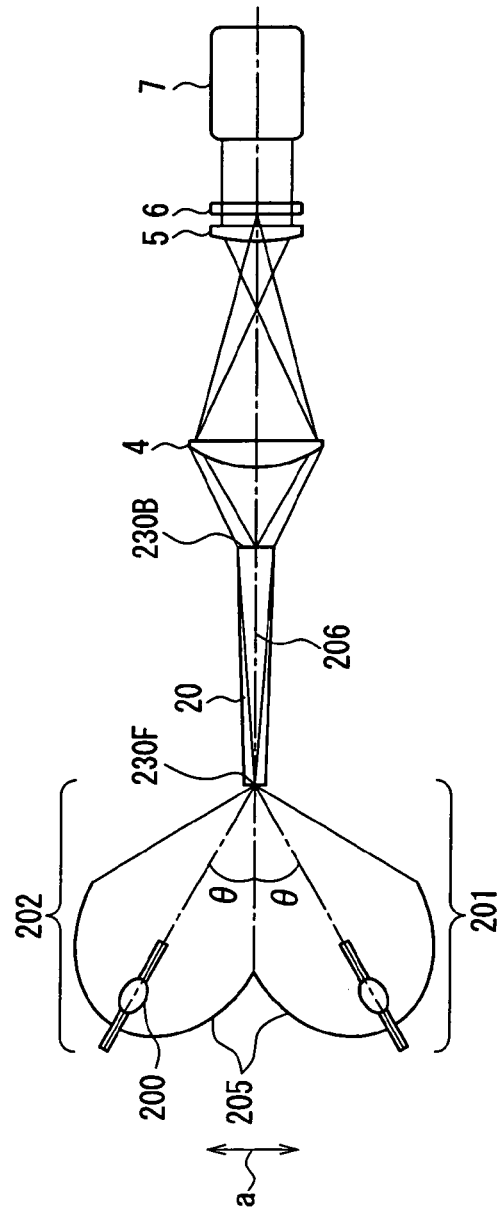
FIG. 14A is a top view of a projection image display device according to Embodiment 5 of the present invention.
Figure 14B:
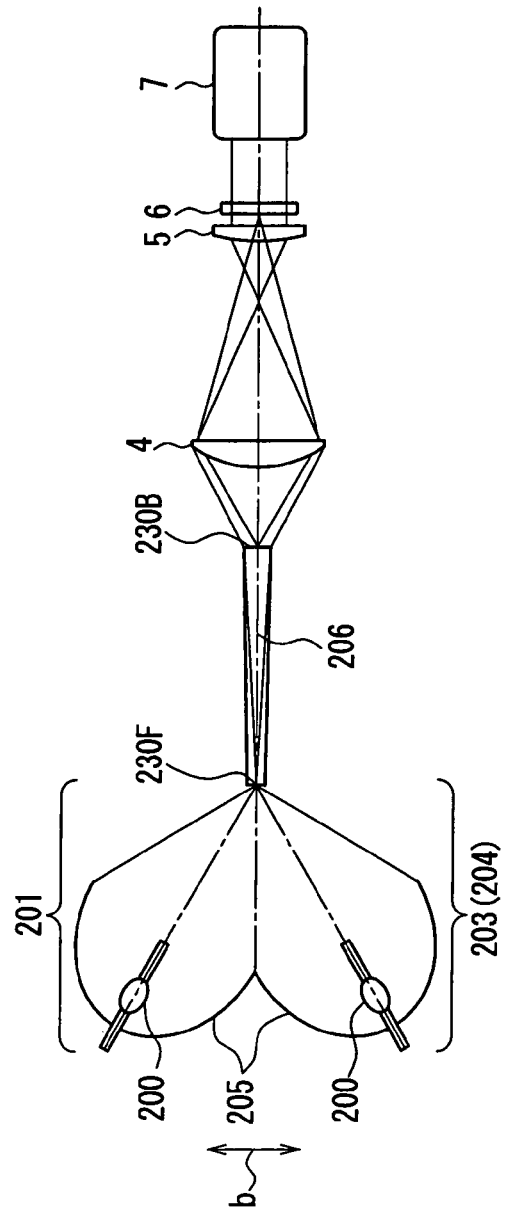
FIG. 14B is a lateral view of FIG. 14A.

Each of the above-described embodiments had two light source portions, but Embodiment 5 is an example in which four light source portions are used. FIG. 14A is a top view of a projection image display device according to Embodiment 5 and FIG. 14B is a lateral view.

The projection image display device according to the present embodiment is provided with four light source portions 201 to 204, a rod integrator 20, a relay lens system 4 that guides the light flux emitted from the rod integrator 20, a field lens 5, a transmissive light valve 6 that modulates the light flux guided by the relay lens system 4 to form an image, and a projection lens 7 that projects the image formed by the light valve 6. Reference numeral 206 indicates the center line of the rod integrator 20.

The light source portions 201 to 204 have the same structure and are respectively provided with a light source 200, and a concave mirror 205 which is a condenser optical system that condenses light from the light source 2. The number of light source portions is different compared to the structure shown in FIG. 1, but the structure of each of the light source portions is the same as the light source portions in FIG. 1.

Figure 15:
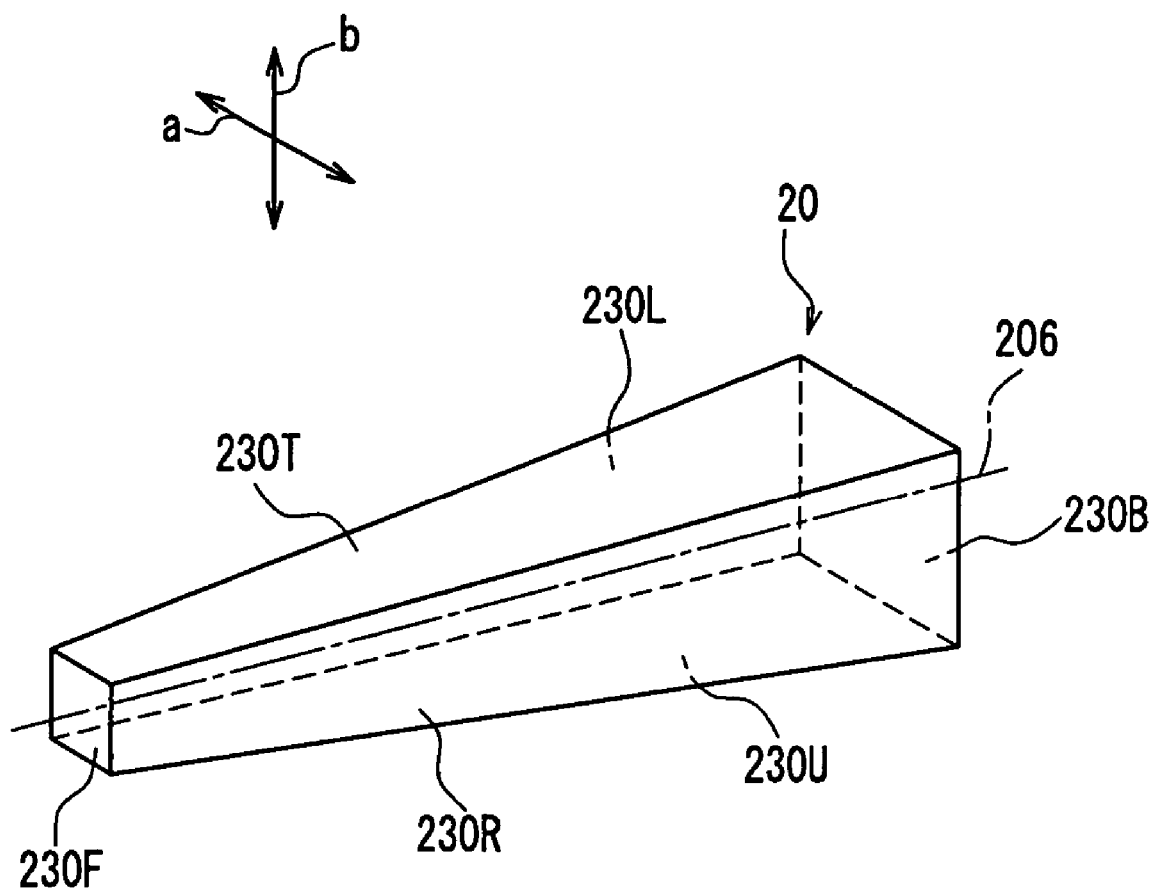
FIG. 15 is a perspective view of a rod integrator according to Embodiment 5 of the present invention.
Figure 16A:
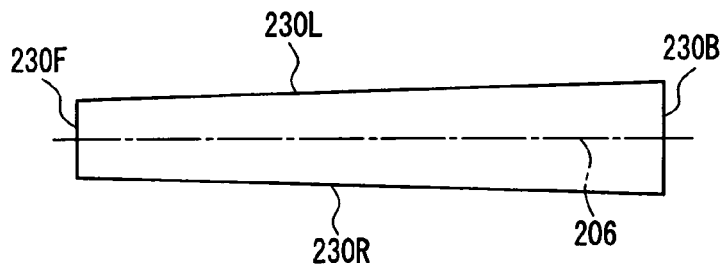
FIG. 16A is a top view of a rod integrator according to Embodiment 5 of the present invention.
Figure 16B:
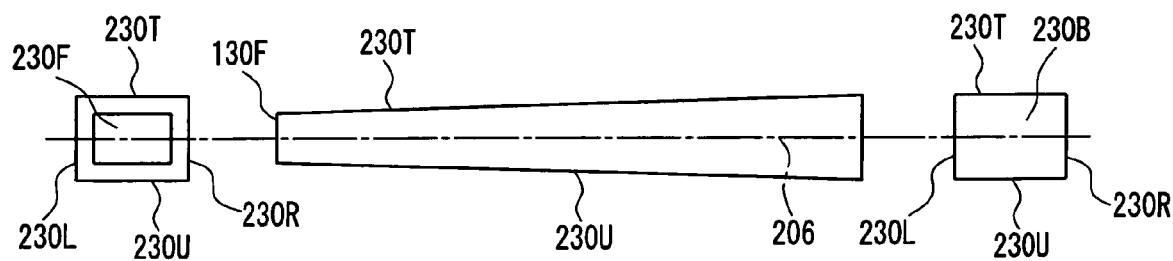
FIG. 16B includes a lateral view and left and right lateral views of the rod integrator shown in FIG. 16A.

FIG. 15 is a perspective view of the rod integrator 20, while FIG. 16A is a top view and FIG. 16B includes a lateral view and left and right lateral views. As shown in FIG. 15, the rod integrator 20 is a columnar optical element provided with an incident end face 230F at a front side, an exit end face 230B at a back side, and four side surfaces (230T, 230U, 230L, and 230R).

Compared with the rod integrator 1 of the above-described embodiments shown in FIG. 2, in which, of the two pairs of opposing side surfaces, only one pair of side surfaces, 130L and 130R, were formed as tapered surfaces, in the present embodiment, the two pairs of side faces are formed as tapered surfaces.

That is, the opposing side surfaces 230L and 230R face each other at an inclination of a predetermined angle such that both side surfaces 230L and 230R become farther apart from each other from the incident end face 230F toward the exit end face 230B (see FIG. 16A). The same is true also for the opposing surfaces 230T and 230U (see FIG. 16B).

As described above, the incident end face 230F of the rod integrator 20 is arranged in the vicinity of the second focal point of the concave mirrors 205 and incident light is totally reflected as appropriate in the vertical direction and horizontal direction of the rod integrator 20, and then emitted from the exit end face 230B of the rod integrator 20.

In FIG. 14A, the pair of two light source portions 201 and 202 are arranged in the horizontal direction (the direction of the arrow "a"). In this case, the pair of two light source portions 203 and 204 are arranged in the same way behind the paper plane. Furthermore, in FIG. 14B, the pair of two light source portions 201 and 203 are arranged in the vertical direction (the direction of the arrow "b"). In this case, the pair of two light source portions 202 and 204 are arranged in the same way behind the paper plane.

In the present embodiment, there are four light source portions, with two of these arranged in the horizontal direction and two arranged in the vertical direction.

That is, the structure of the light source portions of Embodiment 5 has two light source portions arranged in the horizontal direction or the vertical direction and a further two light source portions arranged parallel to these. In the present Embodiment 5, the light source portions are provided in accordance with the two respective pairs of tapered surfaces and there is a total of four light source portions.

Figure 17:
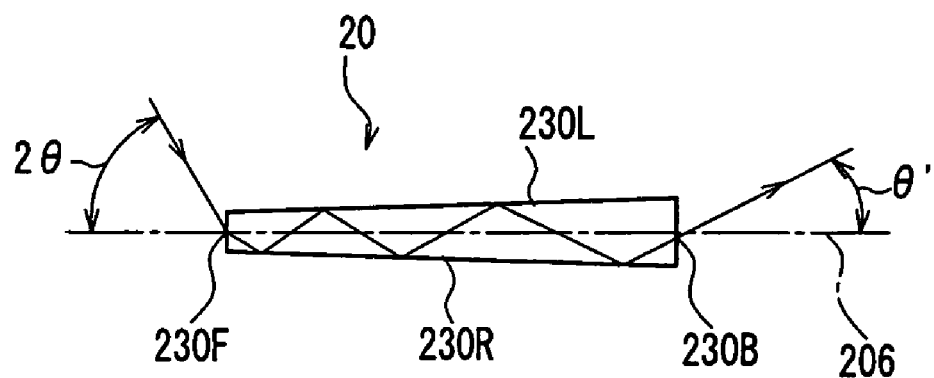
FIG. 17 is a top view of the operation of a light ray that is incident on the rod integrator according to Embodiment 5 of the present invention.
Figure 18:
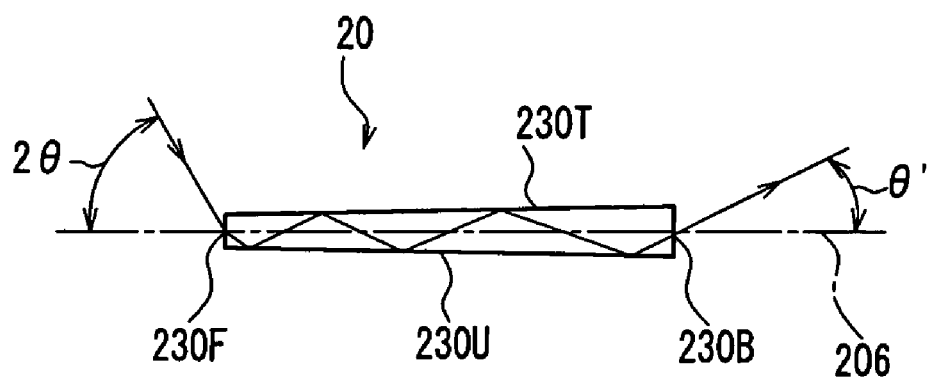
FIG. 18 is a lateral view of the operation of a light ray that is incident on the rod integrator according to Embodiment 5 of the present invention.

The following is a description of the fundamental operation of the rod integrator 20. FIG. 17 is a top view of the rod integrator 20 showing the behavior of an incident light ray. FIG. 18 is a lateral view of the rod integrator 20 showing the behavior of an incident light ray.

FIG. 17 shows how the incident light ray enters the incident end face 230F at the maximum angle (2θ), and is then reflected inside the rod integrator 20 and emitted from the exit end face 230B. As shown in FIG. 17, an incident light ray at the maximum angle 2θ is emitted from the exit end face 230B at an angle θ' that is different from the maximum angle 2θ due to being totally reflected as appropriate by the pair of tapered surfaces 230L and 230R of the rod integrator 20.

This is the same also in FIG. 18. An incident light ray at the maximum angle 2θ is emitted from the exit end face 230B at an angle θ' that is different from the maximum angle 2θ due to being totally reflected as appropriate by the pair of tapered surfaces 230T and 230U of the rod integrator 20.

In other words, with the present embodiment, the incident light ray at an angle of 2θ in the horizontal direction and the incident light ray at an angle of 2θ in the vertical direction are both emitted at the exit end face 230B at an angle of θ'.

Since the present embodiment, has such a large total number of four light source portions, the divergence angle of light at the exit end face can be made smaller than the divergence angle of light at the incident end face in the horizontal direction and the vertical direction as described above, which is advantageous when a light of a very high brightness is desired.

Embodiment 6

Embodiment 1 was described with an example in which the incident angle and the converging angle of the light incident at the rod integrator 1 were the same, but in Embodiment 6, the incident angle is smaller than the converging angle.

Figure 19:
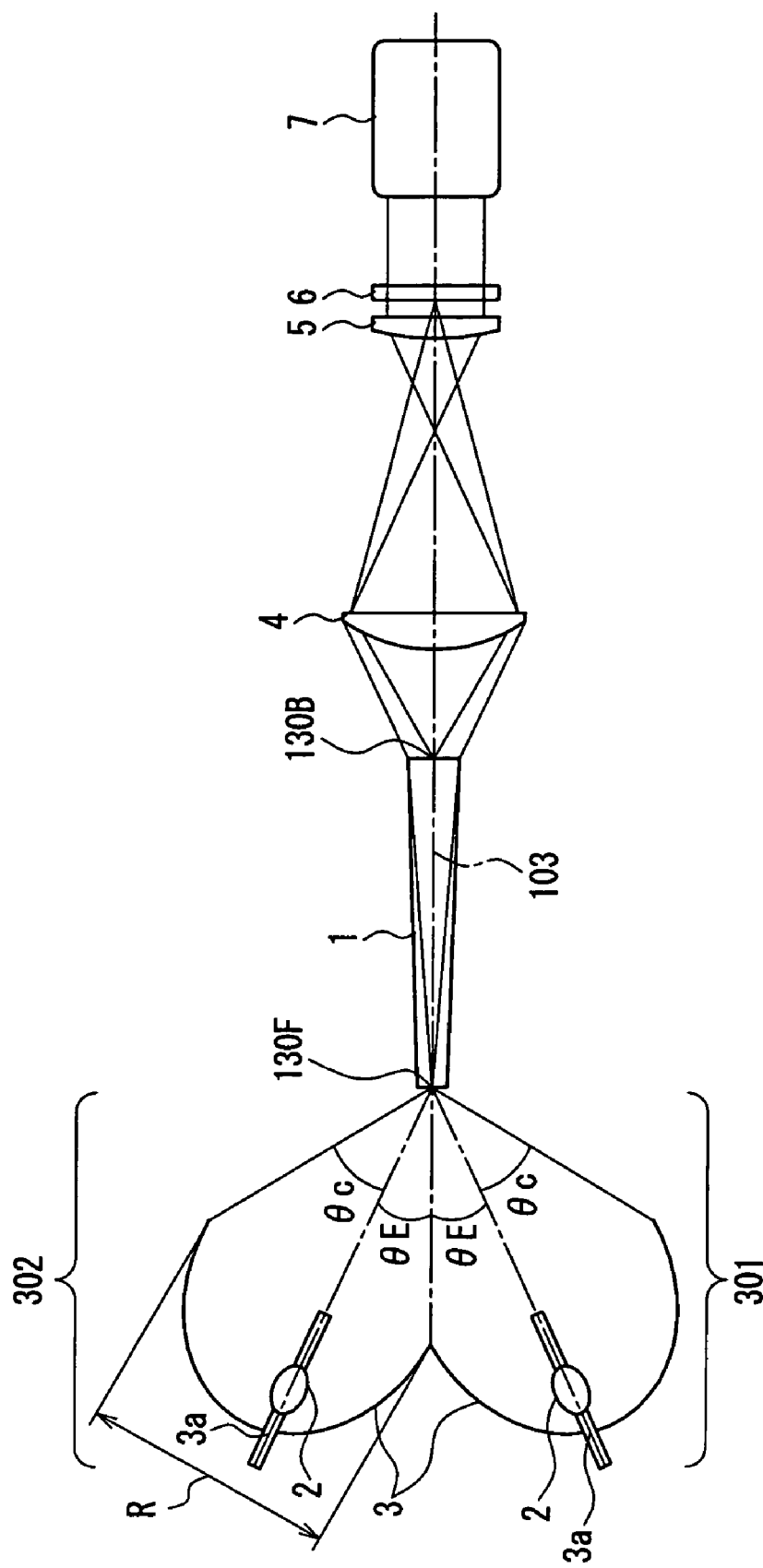
FIG. 19 is a top view of a conceptual diagram of an optical system according to Embodiment 6 of the present invention.

FIG. 19 is a top view of a conceptual diagram of an optical system according to Embodiment 6. Except for the relationship between the incident angle and the converging angle, the configuration shown in this diagram is the same configuration as shown in FIG. 1 of Embodiment 1, and therefore the same reference numerals as FIG. 1 are used and a further description of each part is omitted.

In FIG. 19, θE is the incident angle and θc is the converging angle. In the configuration of this drawing, the incident angle θE is smaller than the converging angle θc.

The 2θ of the incident end face 130F in FIG. 4 is θE+θc in the present embodiment, and this becomes the angle θ' at the exit end face 130B, which is an angle that is different from the incident end face 130F, just like in Embodiment 1. Furthermore, as shown in FIG. 5, the incident angle θ" likewise is maintained and transmitted, then emitted.

For example, incident light in which the maximum angle of θE+θc is 51° (θE=21°) can be emitted with an emission angle θ' of approximately 30°. In this case, the effective horizontal length of the exit face of the rod integrator 1 was set to 7.5 mm, the tapering angle to approximately 1.51848°, the length to 50.4485 mm, the number of reflections on the side surfaces in the longitudinal direction was 4, and quartz (refractive index nd=1.45859) with good heat resistance and optical properties was used for the glass material of the rod integrator 1. Furthermore, when the incident angle θ" in FIG. 5 is 30°, the light is transmitted maintaining this angle, and then emitted at an angle of 30°.

Table 4 below shows calculated values of the tapering angle θT, the incident face length L', the rod integrator length M, and the convergence efficiency normalized to a maximum value of 1, for various incident angles. The effective lengths of the exit face of the rod integrator are an effective horizontal length of 7.5 mm and an effective vertical length of 5.8 mm, and a substantially ideal relay lens system is used for the calculated values of the convergence efficiency. Furthermore, the number of reflections is set to 3, 4, and 5.

In the examples of Table 4, the converging angle θc is fixed at 30° and the incident angle θE is changed in increasing increments of 3 degrees from 15° to 30°. Except for when the incident angle θE is 30°, the relationship between the two is such that the incident angle is smaller than the converging angle. The letter E in Table 4 is the convergence efficiency. The convergence efficiency was calculated using simulation software for evaluating illumination optical systems in which optical devices such as light sources, lenses, and mirrors are modeled to determine what amount of the desired light rays reaches the screen onto which the light rays emitted from the light source are projected. The values shown in Table 4 are normalized to a maximum value of 1 for each of the settings for the number of reflections in the rod integrator.

TABLE 4

|  | θE | θc | θMAX (θE = θc) | θT | L' | M | E |
|---|---|---|---|---|---|---|---|
| n = 3 | 15 | 30 | 45 | 1.49186 | 5.50330 | 42.1731 | 0.967 |
|  | 18 | 30 | 48 | 1.76380 | 5.04612 | 39.8436 | 0.993 |
|  | 21 | 30 | 51 | 2.02464 | 4.82535 | 37.8295 | 1 |
|  | 24 | 30 | 54 | 2.27328 | 4.63525 | 36.0827 | 0.994 |
|  | 27 | 30 | 57 | 2.50855 | 4.47136 | 34.5652 | 0.974 |
|  | 30 | 30 | 60 | 2.72926 | 4.33013 | 33.2476 | 0.942 |

TABLE 4-continued

|   | θE | θc | θMAX (θE = θc) | θT | L' | M | E |
|---|----|----|----|----|----|----|----|
| n = 4 | 15 | 30 | 45 | 1.1189 | 5.50330 | 56.2324 | 0.970 |
|   | 18 | 30 | 48 | 1.32285 | 5.04612 | 53.1321 | 0.993 |
|   | 21 | 30 | 51 | 1.51848 | 4.82535 | 50.4485 | 1 |
|   | 24 | 30 | 54 | 1.70496 | 4.63525 | 48.1213 | 0.993 |
|   | 27 | 30 | 57 | 1.88142 | 4.47136 | 46.0999 | 0.976 |
|   | 30 | 30 | 60 | 2.04694 | 4.33013 | 44.3449 | 0.949 |
| n = 5 | 15 | 30 | 45 | 0.89512 | 5.30330 | 58.501 | 0.968 |
|   | 18 | 30 | 48 | 1.05828 | 5.04612 | 59.955 | 0.992 |
|   | 21 | 30 | 51 | 1.21479 | 4.82535 | 60.453 | 1 |
|   | 24 | 30 | 54 | 1.36397 | 4.63525 | 60.233 | 0.996 |
|   | 27 | 30 | 57 | 1.50513 | 4.47136 | 59.274 | 0.980 |
|   | 30 | 30 | 60 | 1.63756 | 4.33013 | 57.487 | 0.951 |

Figure 20:
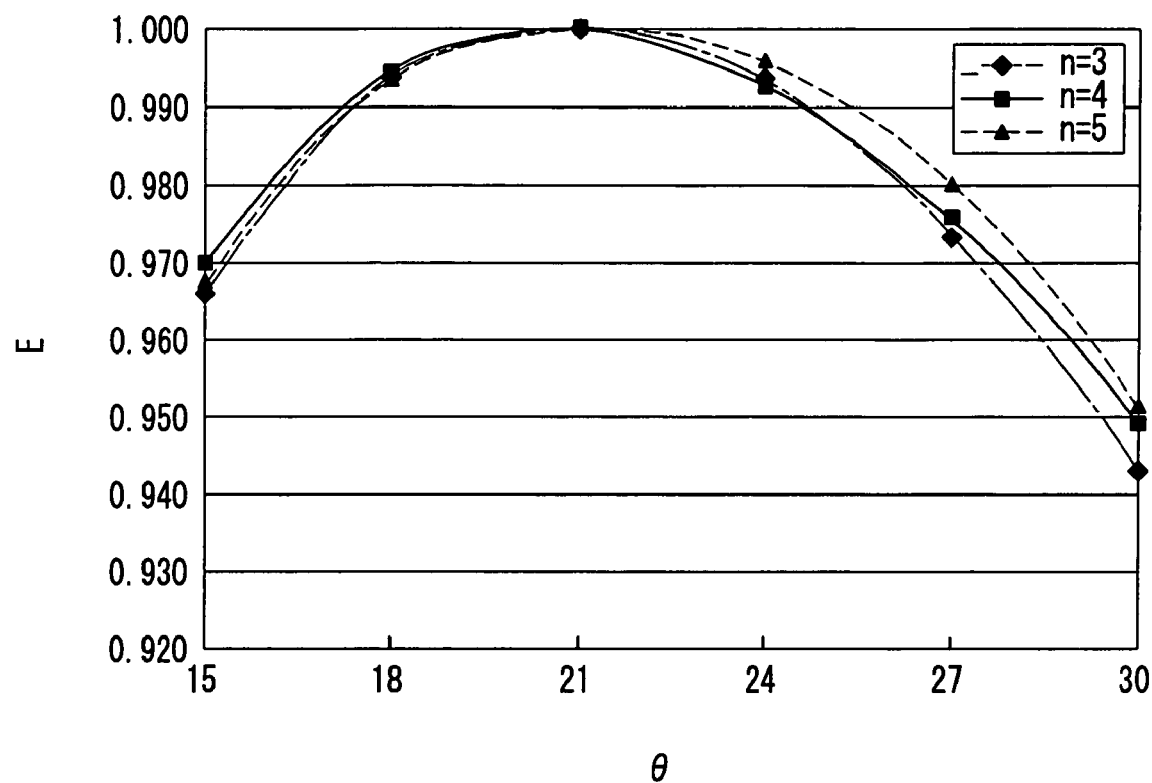
FIG. 20 shows a relationship between convergence efficiency and incident angles.
Figure 21:
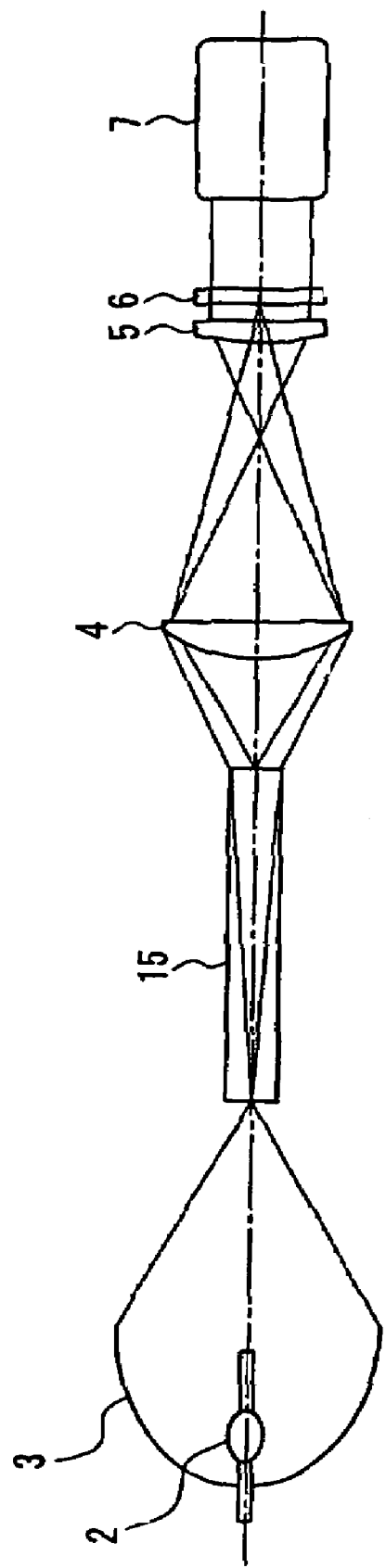
FIG. 21 is a conceptual diagram of an optical system of an example of a conventional projection image display device.
Figure 22:
FIG. 22 is a top view of an example of a conventional rod integrator.
Figure 23:
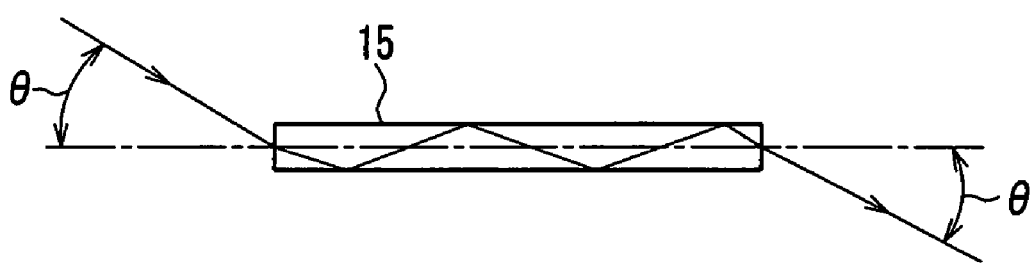
FIG. 23 is a lateral view of an example of a conventional rod integrator.

FIG. 20 shows the relationship between convergence efficiency and incident angle, using the numerical values in Table 4. The horizontal axis θ is the incident angle and the vertical axis E is the convergence efficiency.

In FIG. 19, when the θ marked on the horizontal axis is 30°, then the converging angle is also 30°, but otherwise, the incident angle θ is smaller than the converging angle. As can be seen in FIG. 20, the convergence efficiency is lowest at θ=30° on the horizontal axis, at which the incident angle and the converging angle are the same, and the greatest value is attained when the incident angle is set to θ=21°, which is 70% of the converging angle.

In other words, it is evident according to Table 4 and FIG. 20 that device brightness can be improved when the incident angle is smaller than the converging angle. In this case, convergence efficiency shows particularly good values when the ratio of the incident angle θ to the converging angle is in the range of at least 60% (θ=18°) and at most 80% (θ=24°).

It should be noted that although the description here was for the case of two light sources, it also can be applied to configurations with four light sources, as in Embodiment 5.

Furthermore, in the configurations of above-described embodiments in which one pair of opposing side surfaces of the rod integrator 1 are parallel planes and the other pair of opposing side surfaces are planes that face each other with a predetermined angle of inclination, the rod integrator 1 may be configured such that at least a portion of one pair of opposing side surfaces is made of parallel planes and at least a portion of the other pair of opposing side surfaces is made of planes that face each other with a predetermined angle of inclination. This is because the emission angle can be narrowed to a desired angle and uniform illumination can be achieved by reflecting a light flux between pairs of planes that face each other with a predetermined angle of inclination. This aspect is true also for embodiments 1 through 5.

Furthermore, the exit end face 130B of the rod integrator has to be polished during production. However, the end portions of the rod integrator 1, that is, the four edges and four corners of the exit end face 130B, are sometimes chipped during the polishing process. The size of the chipped of portions may be 0.1 mm or more.

Uniformity of illumination is adversely affected by chipping of the exit end face 130B and unevenness can appear in the illumination.

For this reason, it is preferable that the form of the rod integrator is determined using a length L1 in which an extra length is added to the desired standard length L of the four edges of the rod integrator. In this way, it is possible to prevent the influence caused by chipping of the four edges and four corners of the exit end face 130B from adversely affecting the uniformity of illumination. The extra length is within the range of up to 0.2 mm for example. This is true also for Embodiments 1 through 5.

Furthermore, the rod integrator in the above-described embodiments was described with examples using a glass material, but it also may be a columnar optical element that is hollow with the four inner wall surfaces formed with mirrors. The incident light flux in this configuration is also totally reflected as appropriate by the mirrors of the inner wall surfaces.

INDUSTRIAL APPLICABILITY

As described above, with the present invention, since control can be achieved such that the divergence angle of light in the horizontal direction at the exit end face is different from the divergence angle of light in the horizontal direction at the incident end face, light having high brightness and uniformity can be obtained. For this reason, the present invention is useful in illuminators and projection image display devices equipped with a rod integrator.

The invention claimed is:

1. An illuminator comprising:
  a plurality of light source portions, each light source portion including a lamp and a concave mirror;
  a rod integrator; and
  a relay lens system that guides a light flux emitted from the rod integrator;
  wherein the rod integrator is a columnar optical element having an incident end face at a front side and an exit end face at a back side;
  wherein, when a long-side direction of the exit end face is a horizontal direction and a short-side direction is a vertical direction:
  of four side surfaces other than the front side and the back side of the columnar optical element, a pair of opposing side surfaces in the horizontal direction is formed as tapered surfaces in which the side surfaces face each other at an inclination of a predetermined angle such that a distance between the side surfaces in the horizontal direction increases from the incident end face toward the exit end face, and
  a pair of opposing side surfaces in the vertical direction is provided with a portion in which the side surfaces are parallel to each other;
  wherein light from the light source portions is converged and irradiated onto a vicinity of the incident end face of the rod integrator;
  wherein two of said light source portions are arranged in the horizontal direction or the vertical direction; and
  wherein a maximum value in the horizontal direction and a maximum value in the vertical direction of the divergence angle of light emitted from the exit end face of the rod integrator are substantially the same.

2. The illuminator according to claim 1, further comprising, when the two light source portions are a first light source portion and a second light source portion, a first reflector for guiding light from the first light source portion to the incident end face of the rod integrator and a second reflector for guiding light from the second light source portion to the incident end face of the rod integrator.

3. The illuminator according to claim 2, wherein the first light source portion and the second light source portion are arranged such that the second light source portion is in an emission direction of the first light source portion.

4. The illuminator according to claim 3, further comprising a projection lens, wherein optical axes of the concave mirrors of the two light source portions and an optical axis of the projection lens are perpendicular.

5. The illuminator according to claim 3, wherein the first light source portion and the second light source portion are arranged such that an optical axis of a concave mirror of the first light source portion and an optical axis of a concave mirror of the second light source portion do not intersect a center line of the rod integrator.

6. The illuminator according to claim 1;
wherein, when a normal direction on the pair of parallel planes is a first direction and a direction that is perpendicular to a center line of the rod integrator and perpendicular to the first direction is the second direction:
the two light source portions are arranged such that a divergence angle of light entering the incident end face of the rod integrator has a maximum value in the second direction that is larger than a maximum value in the first direction.

7. An illuminator comprising:
a plurality of light source portions, each light source portion including a lamp and a concave mirror;
a rod integrator; and
a relay lens system that guides a light flux emitted from the rod integrator;
wherein the rod integrator is a columnar optical element having an incident end face at a front side and an exit end face at a back side;
wherein, when a long-side direction of the exit end face is a horizontal direction and a short-side direction is a vertical direction:
of four side surfaces other than the front side and the back side of the columnar optical element, a pair of opposing side surfaces in the horizontal direction is formed as tapered surfaces in which the side surfaces face each other at an inclination of a predetermined angle such that a distance between the side surfaces in the horizontal direction increases from the incident end face toward the exit end face, and
a pair of opposing side surfaces in the vertical direction is provided with a portion in which the side surfaces are parallel to each other;
wherein light from the light source portions is converged and irradiated onto a vicinity of the incident end face of the rod integrator; and
wherein two of said light source portions are arranged in the horizontal direction or the vertical direction;
wherein, when an angle between a center line of the rod integrator and an optical axis of the concave mirror that passes through an apex of the concave mirror is an incident angle; and
an angle farmed by a light flux emitted from a most peripheral area of an effective aperture of the concave mirror and the optical axis of the concave mirror that passes through an apex of the concave mirror is a converging angle; then: the incident angle is smaller than the converging angle.

8. The illuminator according to claim 7, wherein a ratio of the incident angle to the converging angle is in a range of at least 60% and at most 80%.

9. A projection image display device, comprising:
a plurality of light source portions, each light source portion including a lamp and a concave mirror;
a rod integrator;
a relay lens system that guides a light flux emitted from the rod integrator;
a light valve that modulates a light flux guided from the relay lens system and forms an image; and
a projection lens that projects an image formed by the light valve;
wherein the rod integrator is a columnar optical element having an incident end face at a front side and an exit end face at a back side;
wherein, when a long-side direction of the exit end face is a horizontal direction and a short-side direction is a vertical direction:
of four side surfaces other than the front side and the back side of the columnar optical element, a pair of opposing side surfaces in the horizontal direction is formed as tapered surfaces in which the side surfaces face each other at an inclination of a predetermined angle such that a distance between the side surfaces in the horizontal direction increases from the incident end face toward the exit end face, and
a pair of opposing side surfaces in the vertical direction is provided with a portion in which the side surfaces are parallel to each other;
wherein light from the light source portions is converged and irradiated onto a vicinity of the incident end face of the rod integrator; and
wherein two of said light source portions are arranged in the horizontal direction or the vertical direction;
wherein, when an angle between a center line of the rod integrator and an optical axis of the concave mirror that passes through an apex of the concave mirror is an incident angle; and
an angle formed by a light flux emitted from a most peripheral area of an effective aperture of the concave mirror and the optical axis of the concave mirror that passes through an apex of the concave mirror is a converging angle; then:
the incident angle is smaller than the converging angle.

10. The projection image display device according to claim 9, further comprising, when the two light source portions are a first light source portion and a second light source portion, a first reflector for guiding light from the first light source portion to the incident end face of the rod integrator and a second reflector for guiding light from the second light source portion to the incident end face of the rod integrator.

11. The projection image display device according to claim 10, wherein the first light source portion and the second light source portion are arranged such that the second light source portion is in an emission direction of the first light source portion.

12. The projection image display device according to claim 11, further comprising a projection lens, wherein optical axes of the concave minors of the two light source portions and an optical axis of the projection lens are perpendicular.

13. The projection image display device according to claim 11, wherein the first light source portion and the second light source portion are arranged such that an optical axis of a concave mirror of the first light source portion and an optical axis of a concave mirror of the second light source portion do not intersect a center line of the rod integrator.

14. The projection image display device according to claim 9, comprising a means for turning light that turns a light flux emitted from the rod integrator and guides the light flux to the light valve in accordance with an arrangement of the light valve.

15. The projection image display device according to claim 9;

wherein, when a normal direction on the pair of parallel planes is a first direction and a direction that is perpendicular to a center line of the rod integrator and perpendicular to the first direction is the second direction:

the two light source portions are arranged such that a divergence angle of light entering the incident end face of the rod integrator has a maximum value in the second direction that is larger than a maximum value in the first direction.

* * * * *